US012618861B2

(12) United States Patent
Montazeri

(10) Patent No.: US 12,618,861 B2
(45) Date of Patent: May 5, 2026

(54) SAMPLE PREPARATION AND TEST LID FOR AUTOMATED ANALYSIS OF BIOLOGICAL AND CHEMICAL SAMPLES

(71) Applicant: Spectacular Labs, Inc., Richmond, CA (US)

(72) Inventor: Okhtay Montazeri, Richmond, CA (US)

(73) Assignee: Spectacular Labs, Inc., Richmond, CA (US)

( * ) Notice: Subject to any disclaimer, the term of this patent is extended or adjusted under 35 U.S.C. 154(b) by 617 days.

(21) Appl. No.: 18/064,210

(22) Filed: Dec. 9, 2022

(65) Prior Publication Data

US 2024/0192243 A1 Jun. 13, 2024

(51) Int. Cl.
| | |
|---|---|
| *G01N 35/10* | (2006.01) |
| *B01L 3/00* | (2006.01) |
| *G01N 21/31* | (2006.01) |
| *G01N 21/64* | (2006.01) |
| *G01N 35/00* | (2006.01) |

(52) U.S. Cl.
CPC .... *G01N 35/1002* (2013.01); *B01L 3/502715* (2013.01); *G01N 21/31* (2013.01); *G01N 21/6428* (2013.01); *B01L 2300/047* (2013.01); *B01L 2300/048* (2013.01); *G01N 2035/00356* (2013.01)

(58) Field of Classification Search
CPC .............. G01N 35/1002; G01N 21/31; G01N 21/6428; G01N 2035/00356; B01L 3/502715; B01L 2300/047; B01L 2300/048; B01L 3/502; B01L 3/50825

USPC .......................................................... 422/81
See application file for complete search history.

(56) References Cited

U.S. PATENT DOCUMENTS

| | | | |
|---|---|---|---|
| 9,234,227 | B2 | 1/2016 | Lu et al. |
| 9,340,817 | B2 | 5/2016 | Koeris et al. |
| 10,724,068 | B2 | 7/2020 | Samadpour |
| 2013/0122549 | A1 | 5/2013 | Lu et al. |
| 2014/0046722 | A1 | 2/2014 | Rosenbloom et al. |

(Continued)

FOREIGN PATENT DOCUMENTS

| | | | | |
|---|---|---|---|---|
| EP | 2 766 493 | B1 * | 8/2014 | .............. C12Q 1/68 |
| EP | 2766493 | A1 | 8/2014 | |

(Continued)

OTHER PUBLICATIONS

3M Molecular Detection System downloaded from https://www.3m.com/3M/en_US/food-safety-us/foodandbeveragetests/molecular-detection-systems/ on Feb. 3, 2022. 9 pages.

(Continued)

*Primary Examiner* — Christine T Mui
(74) *Attorney, Agent, or Firm* — MUGHAL GAUDRY & FRANKLIN PC

(57) ABSTRACT

A sample preparation lid, comprising a lid body, a first sample preparation vial that extends over the lid body and a second sample preparation vial that extends over the lid body. A first conduit extends between the first sample preparation vial and the second sample preparation vial. The first conduit opens into the first sample preparation vial and into the second sample preparation vial. A second conduit extends through the lid body. The second conduit opens into the first sample preparation vial.

22 Claims, 14 Drawing Sheets

(56)  References Cited

U.S. PATENT DOCUMENTS

2017/0043335 A1    2/2017  Khattak et al.

FOREIGN PATENT DOCUMENTS

EP        3769840  A1     1/2021
WO        2021016374  A1     1/2021

OTHER PUBLICATIONS

Espinosa, R. et al., "Regional localization of the human thrombomodulin gene to 20p12-cen," Genomics . Oct. 1989;5(3):649-50. doi: 10.1016/0888-7543(89)90038-4 (2 pages).

Hamilton foodInspect NIMBUS for 3M Molecular Detection System. downloaded from https://www.hamiltoncompany.com/automated-liquid-handling/assay-ready-workstations/foodinspect-nimbus on Feb. 3, 2022. 6 pages.

https://lexagene.com/ Downloaded on Mar. 4, 2022. 4 pages.

https://www.clearlabs.com/ downloaded on Mar. 4, 2022. 6 pages.

Kiddle et al., "GMO detection using a bioluminescent real time reporter (BART) of loop mediated isothermal amplification (LAMP) suitable for field use," BMC Biotechnology, 12, Article No. 15. Published Apr. 30, 2012. https://doi.org/10.1186/1472-6750-12-15. 13 pages.

Martzy et al., "A loop-mediated isothermal amplification (LAMP) assay for the rapid detection of *Enterococcus* spp. in water," Water Research vol. 122, Oct. 1, 2017, pp. 62-69. https://doi.org/10.1016/j.watres.2017.05.023.

Snapdna, Solving the Global Food Safety Challenge. Downloaded from https://www.snapdna.com on Feb. 3, 2022. 3 pages.

Weidemaier et al., "Real-Time Pathogen Monitoring during Enrichment: a Novel Nanotechnology Based Approach to Food Safety Testing," International Journal of Food Microbiology 198 (2015) 19-27 (9 pages).

* cited by examiner

SAMPLE PREPARATION AND TEST LID FOR AUTOMATED ANALYSIS OF BIOLOGICAL AND CHEMICAL SAMPLES

BACKGROUND

The ability to rapidly detect pathogens and other microbes at food preparation facilities such as consumer product manufacturers and food processing plants is paramount for the public health while ensuring timely distribution of products. To date, some important bacteriological and viral assays require culturing to achieve sufficient confidence in detection and identification of pathogens. Culturing of microbes may generally take 24 to 72 hours or longer. In many situations, samples are sent to an off-site bacteriological laboratory which requires additional transportation and wait times. Therefore, the total turn-around time from sampling to results may take several days, in practice. In some cases where the initial microorganism load is assumed to be relatively high, rapid assay analyzers which are commercially available, may be used for use in on-site industrial laboratories. These rapid assay analyzers do not require culturing as the initial load is assumed to be sufficiently high. The assays themselves may take minutes to hours to complete. Most rapid assay analyzers may be relatively small and modular units that employ automated or robotic sample preparation and detection. They may be based on enzyme-linked immunosorbent assay (ELISA) protocols or polymerase chain reaction (PCR) protocols. While these rapid apparatuses might serve their purpose, without an initial culturing or enrichment they have a limited set of use cases. Enrichment is needed to ensure that the sample is safe, not just for immediate consumption, but for the duration of its expected shelf-life, which may be days, weeks, or months in the future. Specifically, an initial enrichment is required to ensure that a) the microorganisms in question are indeed viable and not dead, and b) very low initial microorganism levels are amplified to make their detection reliable and reproducible. As such, combining rapid testing with enrichment in a smart and easy to use system can help prevent many outbreaks that currently go undetected. Such an approach offers a significant improvement over currently available rapid test systems that only rely on DNA fragments for pathogen identification, and do not test for microorganism viability. These rapid test systems do not include an enrichment step, and as a result are relatively insensitive to microorganism-viability resulting in high false positives. Other systems requiring prolonged incubation periods without integrating incubation and rapid testing may result in delaying timely reporting of results.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1A:
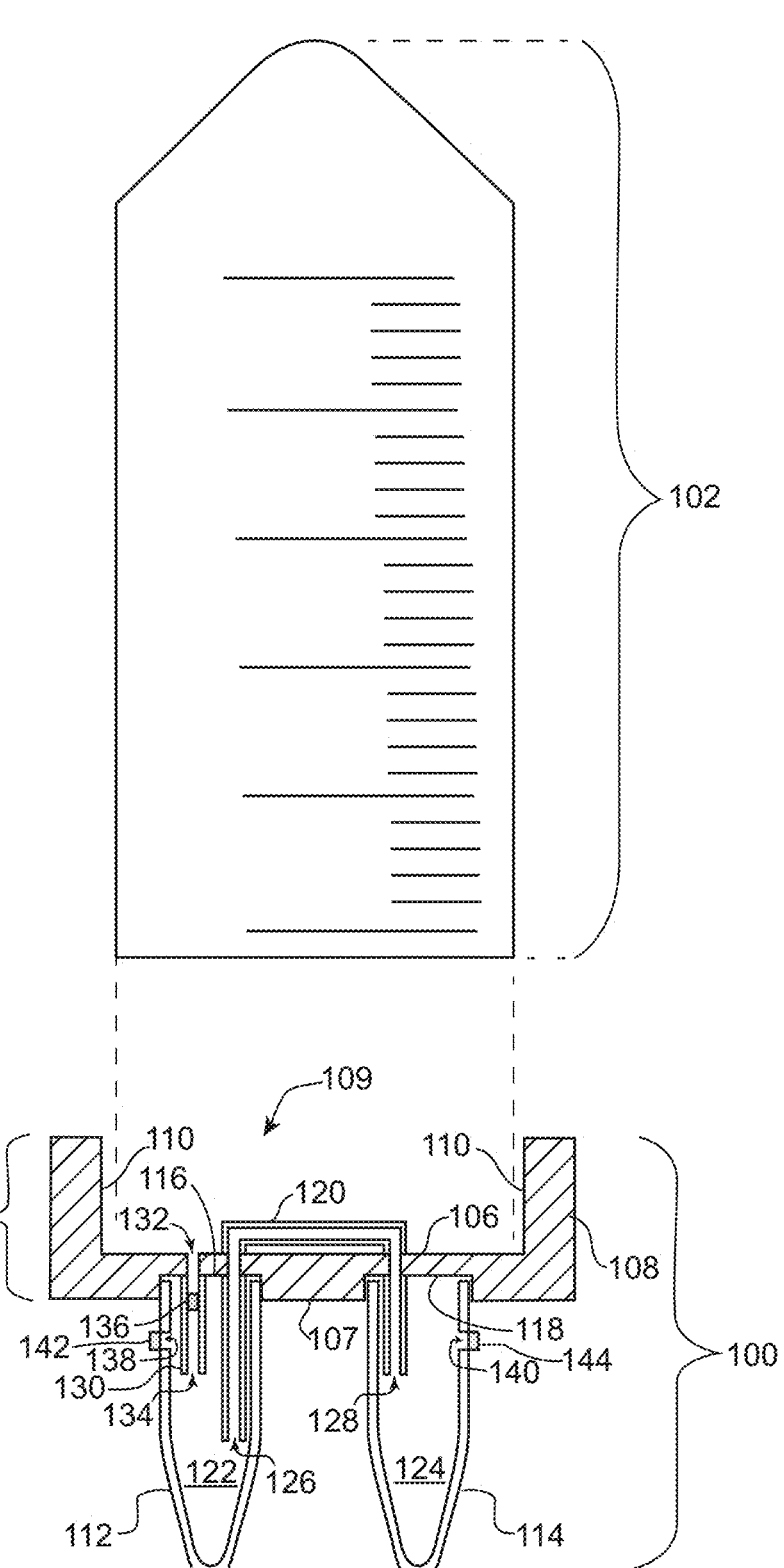
FIG. 1A illustrates a cross sectional view in the x-z plane of a sample preparation lid, in accordance with at least one embodiment.

Disclosed herein is a sample preparation assembly and a self-contained sample preparation and analysis laboratory system comprising the sample preparation assembly. In at least one embodiment, the sample preparation assembly comprises a sample preparation lid and a fluid container to which the sample preparation lid is attached. In at least one embodiment, the sample preparation lid may comprise one or more sample preparation vials and interconnecting channels integrated into the lid structure. In at least one embodiment, channels may interconnect two sample preparation vials.

In at least one embodiment, the self-contained sample preparation and analysis laboratory system comprises an analysis base station onto which the sample preparation assembly may dock. In at least one embodiment, the disclosed sample preparation lid may be configured to fit standard or non-standard tubular and non-tubular fluid containers, such as culture tubes, centrifuge tubes, test tubes, culture bottles, jars, and the like. In at least one embodiment, the fluid container may be entirely straight walled, entirely conical, or a hybrid of straight walls and conical tips. In at least one embodiment, the disclosed sample preparation lid may replace standard screw caps or insertion caps that are commonly employed to fit such fluid containers.

In at least one embodiment, the fluid container may be a standard or non-standard bacteriological culture tube or centrifuge tube, or plastic bag or pouch, that may have a volumetric capacity ranging from 15 milliliters (ml) to 1000 ml. In at least one embodiment, the fluid container may be prefilled with a liquid culture medium for culturing microorganisms or eukaryotic cells. In other embodiments, the fluidic container may contain a medium for dilution or preconditioning of non-biological samples, such as water samples, or other liquid samples.

In at least one embodiment, the sample preparation lid may be an assembly comprising two or more sample preparation vials that are integrated into a lid body. In at least one embodiment, the lid body comprises a first side and a second side. In at least one embodiment, the first side may be a substantially flat or dome-shaped top side of the lid body. In at least one embodiment, the top side is defined as an outer surface of the lid body. In at least one embodiment, during use of the sample preparation lid, the top side may be located above the second side of the lid body. In at least one embodiment, the second side may comprise a sidewall surrounding a lid floor. In at least one embodiment, the sidewall may extend substantially orthogonally from the first (top) side, forming a cavity. In at least one embodiment, the sidewall may engage the fluid container to secure the sample preparation lid to the fluid container, such that the lid floor faces the fluid container. In at least one embodiment, an inner surface of the sidewall may comprise threads to engage mating threads near the mouth of the fluid container. In at least one embodiment, the lid floor may be flush with the mouth of the fluid container when the sample preparation lid is screwed down onto the fluid container.

In at least one embodiment, the one or more sample preparation vials may be oriented to protrude above the first side (e.g., top side) of the sample preparation lid, facing away from the interior of the fluid container to which the sample preparation lid is attached. In at least one embodiment, the sample preparation vials may be prefilled with reagent solution or powder. In at least one embodiment, a first sample preparation vial may contain a lysis medium for lysing microorganism cells. In at least one embodiment, a second sample preparation vial may contain a solution comprising a diagnostic medium for reacting with biomolecules extracted from the lysed cells.

In at least one embodiment, the sample preparation lid may further comprise integrated channels or microchannels embedded within the lid body. A microchannel may be defined as a conduit having a hydraulic diameter (defined below) of less than 1 mm. In at least one embodiment, the integrated channels may interconnect two sample preparation vials. In at least one embodiment, the integrated channels may have a U-shaped or rectangular cross section. In at least one embodiment, integrated channels may extend on inner walls of sample preparation vials. In at least one embodiment, sample preparation vials may comprise a U-shaped or rectangular groove extending along an inner wall. In at least one embodiment, the groove may align with an interconnecting channel integrated into the lid body between the first and second sample preparation vials. In at least one embodiment, a continuous channel between the first and second sample preparation vials may be established by aligning the grooves with the interconnecting channel, enabling fluid transfer between the first and second sample preparation vials.

In at least one embodiment, a free-standing capillary tube may be present extending into the first sample preparation vial from an aperture extending transversely through the lid floor from the first side of the lid body to the second side of the lid body. In at least one embodiment, a tube may be defined as a tube having a hydraulic diameter of less than 5 mm and it may be made of a flexible or rigid material. In at least one embodiment, the free-standing capillary tube may enable fluid transfer from the fluid container (to which the sample preparation lid is attached) to the first sample preparation vial.

In at least one embodiment, the sample preparation lid may comprise free-standing conduits in the form of flexible capillary tubing. In at least one embodiment, the capillary tubing may comprise a free-standing tube interconnecting two sample preparation vials. In at least one embodiment, a second free-standing capillary tube may extend into a first sample preparation vial from an aperture extending from the first side of the lid body to the second side of the lid body. In at least one embodiment, the second capillary tube may enable fluid transfer from the fluid container to the first sample preparation vial.

In at least one embodiment, the sample preparation lid may further comprise a third sample preparation vial interconnected to the first sample preparation vial and/or the second sample preparation vial through a second and third interconnecting channel or tube, respectively. In at least one embodiment, a second channel may extend between the third sample preparation vial and the first sample preparation vial. In such a configuration, the first sample preparation vial is connected to the second and to the third sample preparation vials, according to at least one embodiment. In at least one embodiment, a third conduit may interconnect the third sample preparation vial with the second sample preparation vial. In at least one embodiment, the sample preparation lid may further comprise a fourth sample preparation vial connected to one or more of the first sample preparation vial, second sample preparation vial and third sample preparation vial.

In at least one embodiment, the sample preparation vials and lid body may comprise the same material or different materials. In at least one embodiment, sample preparation vials may comprise a suitable polymer material, such as Polydimethylsiloxane (PDMS), or alternatively, high-density polyethylene. In at least one embodiment, the lid body may also comprise high-density polyethylene, or a rigid thermoset plastic such as acrylonitrile butadiene styrene (ABS). While the lid body may comprise a rigid material, in at least one embodiment, the sample preparation vials may comprise a compliant material that is elastically deformable.

In at least one embodiment, the sample preparation lid and sample preparation vials may comprise substantially the same polymeric materials. In at least one embodiment, sample preparation vials may comprise polymer formulations that provide flexibility. In at least one embodiment, the lid body may comprise a polymer material that provides strength. In at least one embodiment, the lid body and sample preparation vials may comprise high-density polyethylene or polypropylene. In at least one embodiment, the sample preparation lid assembly (including lid body and sample preparation vials) may be fabricated by injection molding, 3D printing, or other suitable additive processes. In at least one embodiment, the sample preparation vials and lid bodies may be manufactured in separate processes. In at least one embodiment, separately fabricated sample preparation vials and lid bodies may be assembled in a subsequent assembly process. In at least one embodiment, sample preparation vials may be formed integrally with the lid body in a single or multi-step injection molding or 3D printing process.

To effectuate fluid transfer into the sample preparation vials of the sample preparation lid, in at least one embodiment, an automated analysis station, comprising automation for managing transfer of fluids into and between the sample preparation vials of the sample preparation lid for sample preparation, is provided. In addition to effectuating fluid transfer between the sample preparation vials, in at least one embodiment, the automated analysis station may manage sample preparation stages, such as bacterial or chemical sample culturing and incubation, and final assay. Together with a sample preparation lid-fluidic container subsystem, the automated analysis station is a self-contained sample preparation and analysis laboratory, according to at least one embodiment.

In at least one embodiment, the automated analysis station may effectuate and manage fluid transfers between the fluid container (e.g., a culture tube) and the sample preparation lid, and at least one sample preparation vial on the sample preparation lid. In at least one embodiment, the automated analysis station may also manage fluid transfers between sample preparation vials. In at least one embodiment, the automated analysis station comprises pressure and temperature-controlled chambers into which the sample preparation vials may be inserted. In at least one embodiment, automated analysis station may be engaged by manual or automated insertion of the sample preparation vials into corresponding chambers. In at least one embodiment, the fluid container (e.g., a culture tube) and attached sample preparation lid may be inverted, permitting a culture medium contained within the fluid container to contact the sample preparation lid. In at least one embodiment, once seated within the chambers, in at least one embodiment a hermetic seal may be formed around the sample preparation vials, facilitated by an O-ring or other suitable sealing mechanism. In at least one embodiment, the hermetic seal may enable control of the pressure within the chambers independently from one another.

As an example, in at least one embodiment, two sample preparation vials may be simultaneously inserted into a first and second chamber, respectively. The pressure within the chambers may be raised or lowered with respect to the pressure, by activation of one or more pumps coupled to each chamber, according to at least one embodiment. By lowering the pressure within a first chamber, in at least one embodiment, the wall of a first sample preparation vial sealed within may expand, causing a negative pressure and suction within the first sample preparation vial.

In at least one embodiment, this pressure change might be facilitated through small vent holes incorporated on the side walls of the vials. In at least one embodiment, vent holes may mitigate significant expansion or contraction to the sidewalls of the vials. In at least one embodiment, the suction within the first sample preparation vial may draw a liquid sample from the second sample preparation vial. In at least one embodiment, a liquid sample may be drawn from the attached fluid container, which may also be coupled to the first sample preparation vial through a transverse channel (e.g., a channel extending through the lid body). In at least one embodiment, the second sample preparation vial may simultaneously be subjected to an increase in pressure, causing its wall to contract, or alternatively increase the interior pressure through a valve. In at least one embodiment, the pressure inside of the second sample preparation vial may increase, forcing liquid into an interconnecting channel extending between the first and second sample preparation vials. This push and pull effect may actuate the dispensing of samples from the pressurized second sample preparation vial to the depressurized first sample preparation vial, according to at least one embodiment.

In at least one embodiment, mechanical or pneumatic processes may actuate fluid transfer between sample preparation vials. In at least one embodiment, specialized pumping mechanisms within the automated analysis station may regulate movement of liquid through flexible interconnecting micro tubes or channels. In at least one embodiment, fluid transfer from one vial to another may be facilitated by a pumping mechanism acting on the interconnecting tube between the vials. In at least one embodiment, a pumping mechanism may include, non-exhaustively, pressurized chambers, actuators such as pistons or syringes (e.g., a piston or syringe pump) or a peristaltic pump. In at least one embodiment, other suitable pumping mechanisms may be employed. The pumping mechanism may act by exerting a pressure on several sections of the tube to move the fluid from one chamber to another, according to at least one embodiment.

In at least one embodiment, the automated analysis station may also be operable to control the temperature within the chambers. In this manner, a sample preparation stage, such as bacterial lysis, may proceed at an optimal temperature within the first sample preparation vial, according to at least one embodiment. In at least one embodiment, the temperature may be ramped and cooled for specified durations (e.g., time periods), following a desired protocol. In at least one embodiment, the temperature can be controlled by resistive heating, positive temperature coefficient (PTC) heating, or heating by circulating a temperature-controlled fluid that is heated in a heat exchanger within the base unit and routed to corresponding chambers containing the vials.

In at least one embodiment, the automated analysis station comprises a spectrometer and/or an optical detection cell and light sources for optical analysis of analytes. In at least one embodiment, optical signals may comprise measured absorption of light from a white light source or a miniature laser source having a narrow bandwidth, or to measure light emitted from a chemical reaction within the vial. In at least one embodiment, the light source may be within the automated analysis station, providing coherent or incoherent light that may be transmitted through a sample preparation vial containing a colored analyte, or a fluorescent analyte. In at least one embodiment, blue laser light may shine through the wall of the sample preparation vial to excite the fluorophore portion of the fluorescent analyte. In at least one embodiment, fluorescent light emanating from the analyte may be measured by a spectrometer or photodiode.

In at least one embodiment, an example application of the self-contained sample preparation and analysis laboratory is a polymerase chain reaction (PCR) assay for identifying bacterial or viral pathogens. In at least one embodiment, fluid from a first sample preparation vial, employed in this example as a lysis tube, may contain bacterial lysis solution used to break open cellular membranes to release deoxyribonucleic acid (DNA) or ribonucleic acid (RNA). In at least one embodiment, the contents of the first sample preparation vial may be heated for a specified or predetermined first duration. In at least one embodiment, a sample of the lysed solution containing bacterial DNA may then be transferred to a second sample preparation vial, containing a PCR reagent medium, or a similar nucleic amplification system such as isothermal PCR or loop-mediated isothermal amplification (LAMP).

In at least one embodiment, once the sample is transferred from the first sample preparation vial to the second sample preparation vial containing the PCR medium (for example, by the automated sample transfer method described above), the temperature of the second sample preparation vial may be ramped to a programmed value for a specified or predetermined second duration. In at least one embodiment, during this time, the PCR reactions may occur within the second sample preparation vial. In at least one embodiment, the PCR medium may contain a fluorescent marker molecule that binds with specific DNA strands or segments thereof that are unique to bacterial species of interest.

In this disclosure, it is understood that the terms "over," "under." "above," "below." "upper.", "lower," "top," and "bottom" have the usual structural meanings, referring to relative vertical positions within structural embodiments and to their immediate environment as viewed within the associated figures. Similarly, the terms "left." "right.", "side," and "sideways" have the usual structural meanings, referring to relative horizontal positions within structural embodiments and within their immediate environment as viewed within the associated figures.

The terms "substantial" or "substantially" are used within this disclosure to mean "the greater part of." "mostly." or "mostly to fully". For example, "substantially" may qualitatively indicate a measure within 10% of a quantifiable attribute, with the possibility that the measure may range from 90% to 100% of the quantifiable attribute.

Views labeled "cross-sectional," "profile." "plan." and "isometric" correspond to orthogonal planes within a cartesian coordinate system. Thus, cross-sectional and profile views are taken in the x-z plane, plan views are taken in the x-y plane, and isometric views are taken in a 3-dimensional cartesian coordinate system (x-y-z). Where appropriate, drawings are labeled with axes to indicate the orientation of the figure.

FIG. 1A illustrates a cross sectional view in the x-z plane of sample preparation lid 100, in accordance with at least one embodiment. In at least one embodiment, fluid container 102, with which sample preparation lid 100 may be detachable from sample preparation lid 100. Fluid container 102 is also shown in the figure as a separate structure, according to at least one embodiment. In at least one embodiment, fluid container 102 is a tubular vessel, such as a culture tube or centrifuge tube commonly employed in biological and chemical laboratories. In at least one embodiment, fluid container 102 is shown to comprise a conical tip. In at least one embodiment, the conical shape may enable collection of small amounts of centrifuged material. While fluid container 102 is represented as a culture or centrifuge tube, in at least one embodiment, fluid container 102 may be a test tube, a vial, or a bottle.

In at least one embodiment, sample preparation lid 100 may comprise a polymeric material, such as, but not limited to, polypropylene), high-density polyethylene (HDPE), perfluoroalkoxy polymer (PFA), or polytetrafluoroethylene (PTFE).

In at least one embodiment, sample preparation lid 100 comprises lid body 104 (cross-hatched). In at least one embodiment, lid body comprises lid floor 106 and lid sidewall 108. In at least one embodiment, sample preparation lid 100 comprises cavity 109, bounded by lid floor 106 and lid sidewall 108. In at least one embodiment, lid floor 106 is shown as a flat planar portion of sample preparation lid 100. In at least one embodiment, lid floor 106 may be a dome-shaped structure. In at least one embodiment, lid outer surface 107 faces into the interior of fluid container 102. In at least one embodiment, lid outer surface 107 may be flat, as shown. In at least one embodiment, lid sidewall 108 extends substantially orthogonally from the perimeter of lid floor 106. In at least one embodiment, lid sidewall 108 may comprise a substantially smooth inner surface 110 for press-fitting or snap-fitting sample preparation lid 100 onto fluid container 102. In at least one embodiment, inner surface 110 of lid sidewall 108 may comprise threads for engaging mating threads on fluid container 102.

In at least one embodiment, sample preparation lid 100 comprises one or more sample preparation vials, such as sample preparation vials 112 and 114, respectively, integrally coupled to sample preparation lid 100. In at least one embodiment, sample preparation vials 112 and 114 are integral with lid body 104. In at least one embodiment, lid body 104 including sample preparation vials 112 and 114 may be manufactured in an injection molding manufacturing method, where a single mold is employed. In at least one embodiment, lid body 104 and sample preparation vials 112 and 114 may be formed integrally as a single unit by a single mold.

In at least one embodiment, sample preparation vials 112 and 114 may comprise a flexible polymer such as HDPE. In at least one embodiment, the polymer may have a suitable range of elasticity to enable deformation of sample preparation vials 112 and 114 by small changes in pressure.

In at least one embodiment, lid body 104 may be manufactured separately from sample preparation vials 112 and 114. In at least one embodiment, lid body 104 may be made by a first injection molding process. In at least one embodiment, sample preparation vials, such as sample preparation vials 112 and 114, may be made in a second injection molding process. In at least one embodiment, sample preparation vials 112 and 114 may be assembled onto lid body 104 in a subsequent manufacturing operation. In at least one embodiment, sample preparation vials 112 and 114 may be sealed into sockets 116 and 118, respectively.

In at least one embodiment, sample preparation lid 100 comprises conduit 120, extending between sample preparation vial 112 and sample preparation vial 114. In at least one embodiment, conduit 120 is shown as a U-shaped tube partially extending (e.g., substantially horizontally, in the x-direction of the figure) within cavity 109 of sample preparation lid 100. In at least one embodiment, other shapes may also be used for conduit 120. In at least one embodiment, conduit 120 is a non-integrated tube. In at least one embodiment, conduit 120 may have a hydraulic diameter of 1 mm or less. In at least one embodiment, conduit 120 extends through lid floor 106, partially extending into interior volumes 122 and 124 of sample preparation vials 112 and 114, respectively. In at least one embodiment, conduit 120 terminates at openings 126 and 128. In at least one embodiment, openings 126 and 128 are at located at different heights within sample preparation vials 112 and 114, respectively, as shown. In at least one embodiment, openings 126 and 128 are located at substantially the same height within sample preparation vials 112 and 114. In at least one embodiment, conduit 120 may couple sample preparation vials 112 and 114, enabling automated fluid transfer between sample preparation vials 112 and 114.

In at least one embodiment, sample preparation lid 100 comprises conduit 130 that extends a distance into interior volume 122 of sample preparation vial 112. In at least one embodiment, conduit 130 may also be a tube that extends from aperture 132 within lid floor 106. In at least one embodiment, aperture 132 opens into cavity 109 as well as interior volume 122, enabling fluidic coupling between cavity 109 and conduit 130. In at least one embodiment, conduit 130 terminates at opening 134. In at least one embodiment, opening 134 is located above opening 126 of conduit 120 within interior volume 122. In at least one embodiment, conduit 130 may extend further into interior volume 122, locating opening 134 below opening 126. In at least one embodiment, the relative positions of openings 134 and 126 may be adjusted for optimal sampling, mixing, and fluid transfer both into and out of sample preparation vial 112.

In at least one embodiment, a sample of a liquid growth medium stored in fluid container 102 may be transferred into sample preparation vial 112. In at least one embodiment, the small volume of the growth medium may flow through aperture 132 (e.g., by suction) into conduit 130, through opening 134 and into interior volume 122. In at least one embodiment, a liquid reagent solution may be contained within interior volume 122. The growth medium sample may flow into the liquid reagent solution and mix therein by diffusion, according to at least one embodiment.

Reagent contained within interior volume 122 may react with the contents of the growth medium sample, according to at least one embodiment. In at least one embodiment, the reagent solution may comprise a bacterial lysis enzyme. In at least one embodiment, bacterial cells within the growth medium sample may be lysed, releasing cellular contents, including bacterial DNA. In at least one embodiment, the reagent solution may comprise a homogeneous mixture of bacterial cellular contents. In at least one embodiment, a small sample (e.g., several nanoliters to several microliters) of the reagent solution may be transferred into interior volume 124 of sample preparation vial 114 by fluid transfer through conduit 120. In at least one embodiment, interior volume 124 may contain a receiving medium comprising a polymerase chain reaction (PCR) reagent. In at least one embodiment, opening 126 of conduit 120 may be below opening 134 of conduit 130 to obtain a thoroughly lysed sample near the bottom of sample preparation vial 112.

In at least one embodiment, plug 136 may be within conduit 130. In at least one embodiment, plug 136 may comprise a water-soluble material that may dissolve on contact with warm liquid entering conduit 130 from fluid container 102. In at least one embodiment, plug 136 may comprise a water-soluble salt or polymer that dissolves in an aqueous environment at temperatures above incubation temperatures (e.g., above 37° C.) for bacterial proliferation within a growth medium that may be stored within fluid container 102. In at least one embodiment, plug 136 may prevent premature seepage or leakage of liquid from fluid container 102 into interior volume 122.

In at least one embodiment, sample preparation vials 112 and 114 comprise vents 138 and 140, respectively. In at least one embodiment, vents 138 and 140 may be provided to equalize pressure within interior volumes 122 and 124. In at least one embodiment, vents 138 and 140 are capped by gas-permeable membranes 142 and 144, respectively.

Figure 1B:
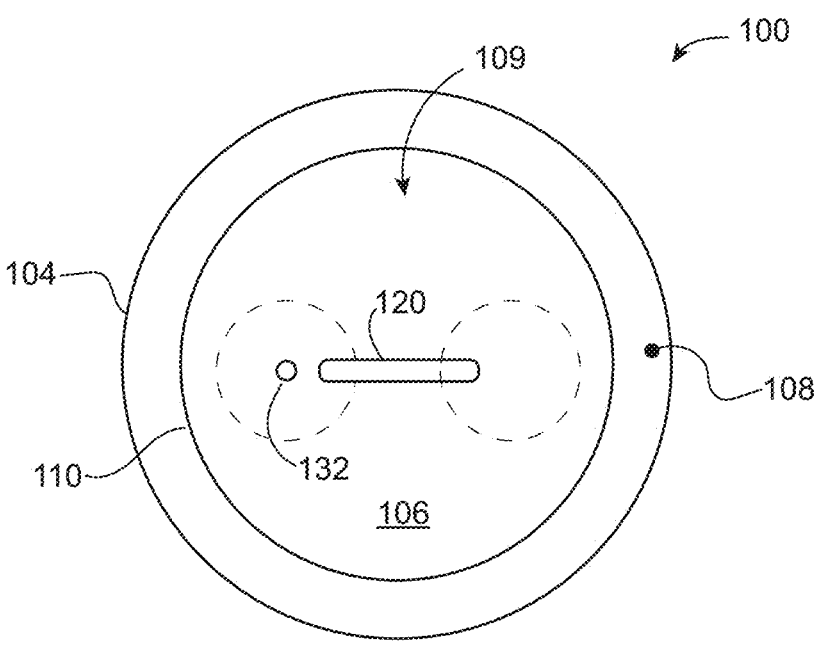
FIG. 1B illustrates a plan view in the x-y plane of a first side of the sample preparation lid of FIG. 1A, in accordance with at least one embodiment.

FIG. 1B illustrates a plan view in the x-y plane of sample preparation lid 100, showing a view into cavity 109, in accordance with at least one embodiment. In at least one embodiment, cavity 109 is surrounded by inner surface 110 of lid sidewall 108 and lid floor 106. In at least one embodiment, sample preparation lid 100 may have a substantially cylindrical geometry, where inner surface 110 has an annular shape. In at least one embodiment, lid floor 106 and lid outer surface 107 are substantially planar (e.g., disk shaped). In at least one embodiment, lid floor 106 and lid outer surface 107 have a dome shape. In at least one embodiment, conduit 120 extends across a portion of lid floor 106 between sample preparation vials 112 and 114, indicated by hidden circles on lid floor 106. In at least one embodiment, aperture 132, adjacent to conduit 120, opens into cavity 109.

Figure 1C:
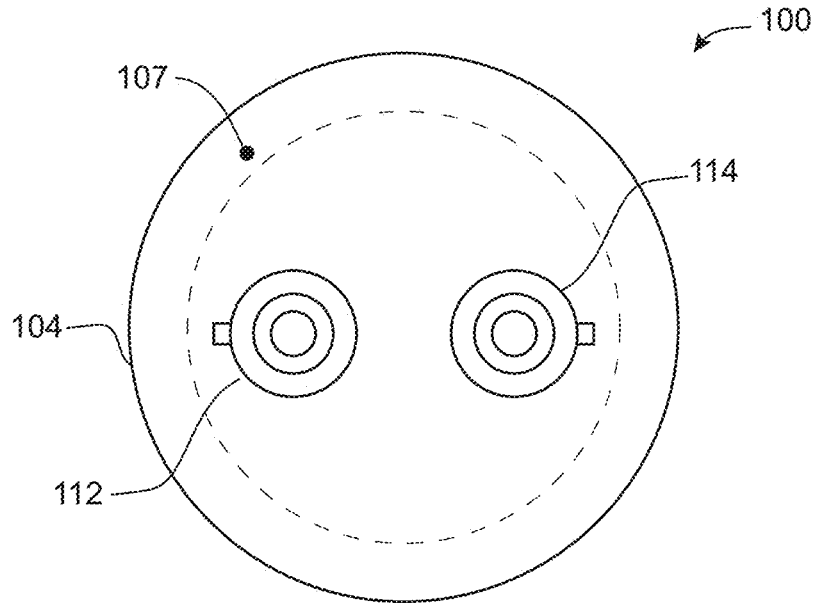
FIG. 1C illustrates a plan view in the x-y plane of a second side of the sample preparation lid of FIG. 1A, in accordance with at least one embodiment.

FIG. 1C illustrates another plan view in the x-y plane of sample preparation lid 100. FIG. 1C shows a plan view of sample preparation vials 112 and 114, extending substantially orthogonally over outer surface 107, according to at least one embodiment.

Figure 2A:
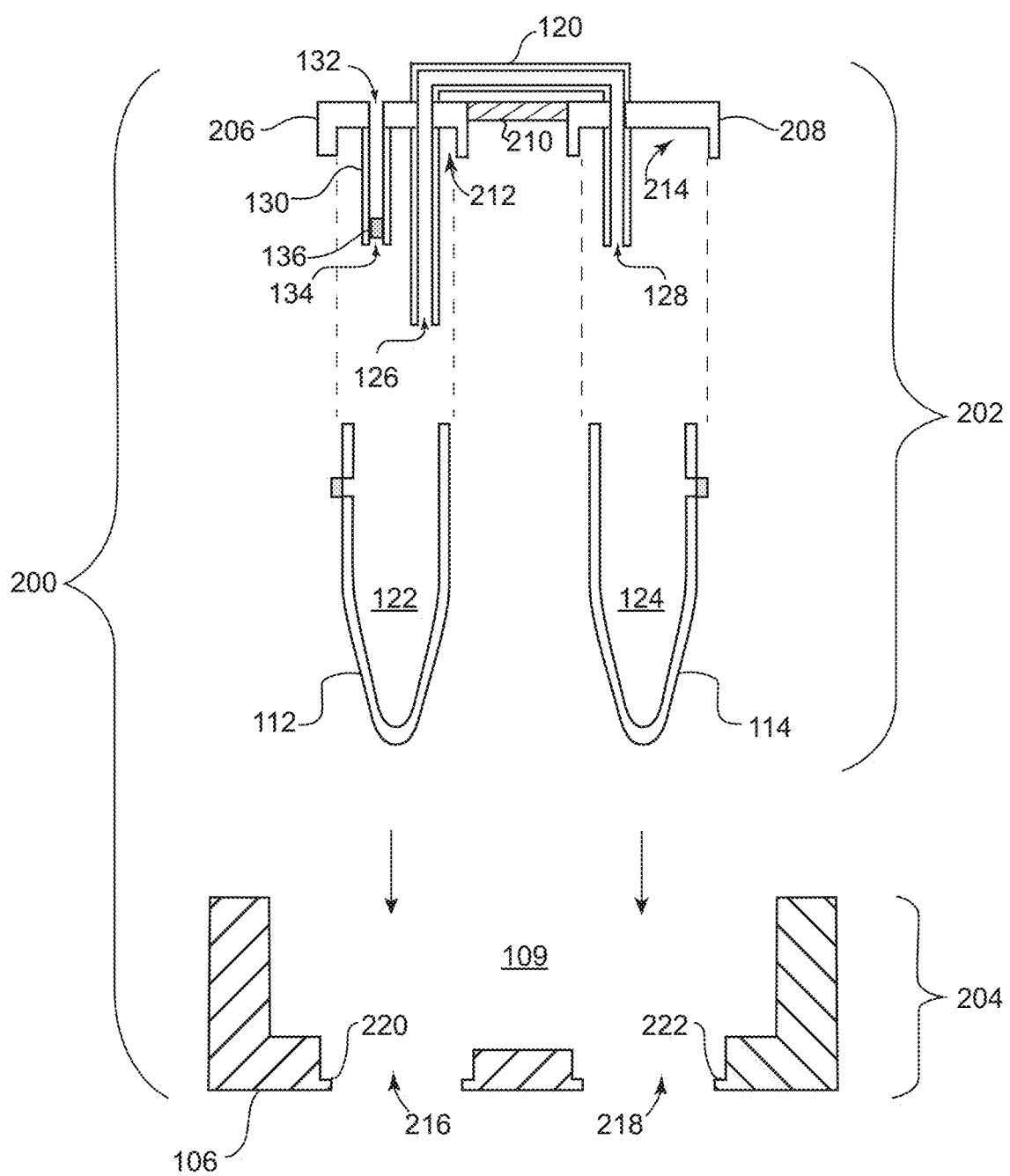
FIG. 2A illustrates an exploded cross-sectional view in the x-z plane of a sample preparation lid, in accordance with at least one embodiment.

FIG. 2A illustrates an exploded cross-sectional view in the x-z plane of sample preparation lid 200, comprising sample preparation vial subassembly 202 and lid body subassembly 204, in accordance with at least one embodiment.

In at least one embodiment, sample preparation lid 200 comprises separate subassemblies (sample preparation vial subassembly 202 and lid body subassembly 204) that may be manufactured in separate processes. In at least one embodiment, the subassemblies may be subsequently assembled, as indicated by the dashed lines and arrows in the figure, into sample preparation lid 200.

In at least one embodiment, sample preparation vial subassembly 202 comprises insertion plugs 206 and 208. In at least one embodiment, insertion plugs 206 and 208 may enable separate manufacture of sample preparation vial subassembly 202 and lid body subassembly 204 if desired. In at least one embodiment, insertion plugs 206 and 208 may be mechanically linked by a bridging piece, such as beam 210. In at least one embodiment, beam 210 may provide structural strength and support to sample preparation vial subassembly 202, reducing or eliminating stresses on potentially delicate features such as conduit 120. In at least one embodiment, beam 210 may be formed integrally with insertion plugs 206 and 208 in an injection molding process forming the entire structure of sample preparation vial subassembly 202.

In at least one embodiment, the U-shaped geometry of conduit 120 may enable extension of conduit 120 through both insertion plugs 206 and 208. In at least one embodiment, the terminal portions of conduit 120, comprising openings 126 and 128, may extend into interior volumes 122 and 124 of sample preparation vials 112 and 114. In at least one embodiment, conduit 130 may be a straight section of conduit that extends below (e.g., downward in the figure) from aperture 132 within insertion plug 206, to opening 134, as shown. In at least one embodiment, aperture 132 may provide the same function of fluidic interconnection between a fluid container, such as fluid container 102 (not shown) and sample preparation vial 112, as described above in relation to sample preparation lid 100 (see FIG. 1A). In at least one embodiment, plug 136 may be included within conduit 130, serving to prevent adventitious fluid transfer into sample preparation vial 112 from a fluid container to which sample preparation lid 200 may be attached. As described above, in at least one embodiment, plug 136 may comprise a material that melts and/or dissolves upon contact with warm reagent held within sample preparation vial 112. In at least one embodiment, the material may be a salt or polymer that is innocuous to the reaction to take place within sample preparation vial 112.

In at least one embodiment, sample preparation vials 112 and 114 and insertion plugs 206 and 208 may be manufactured separately and subsequently assembled as a single unit. In at least one embodiment, sample preparation vials 112 and 114 may be respectively assembled with insertion plugs 206 and 208 and sealed. In at least one embodiment, sample preparation vials 112 and 114 may be inserted within sockets 212 and 214 of insertion plugs 206 and 208, respectively, and sealed to insertion plugs 206 and 208. In at least one embodiment, sample preparation vials 112 and 114 may be formed integrally with insertion plugs 206 and 208 in a single-mold injection molding process.

In at least one embodiment, sample preparation vials 112 and 114 may be manufactured separately from insertion plugs 206 and 208. In at least one embodiment, sample preparation vial subassembly 202 may be assembled onto lid body subassembly 204. In at least one embodiment, insertion plugs 206 and 208 may be inserted into sockets 216 and 218, respectively, within lid body 204. In at least one embodiment, sample preparation vials 112 and 114 may be inserted through sockets 212 and 214, respectively, from the inner side of lid body subassembly 204 (e.g., through the fluid container attachment side of lid body subassembly 204 comprising cavity 109). In at least one embodiment, sockets 212 and 214 may comprise rims 220 and 222, respectively. In at least one embodiment, rims 220 and 222 may enable optimal alignment of insertion plugs 206 and 208 with lid floor 106. In at least one embodiment, an adhesive or sealant may be employed to seal the boundary around the peripheries of insertion plugs 206 and 208. In at least one embodiment, insertion plugs 206 and 208 may comprise lateral extensions (not shown) in lieu of rims 220 and 222, for alignment with lid floor 106.

Figure 2B:
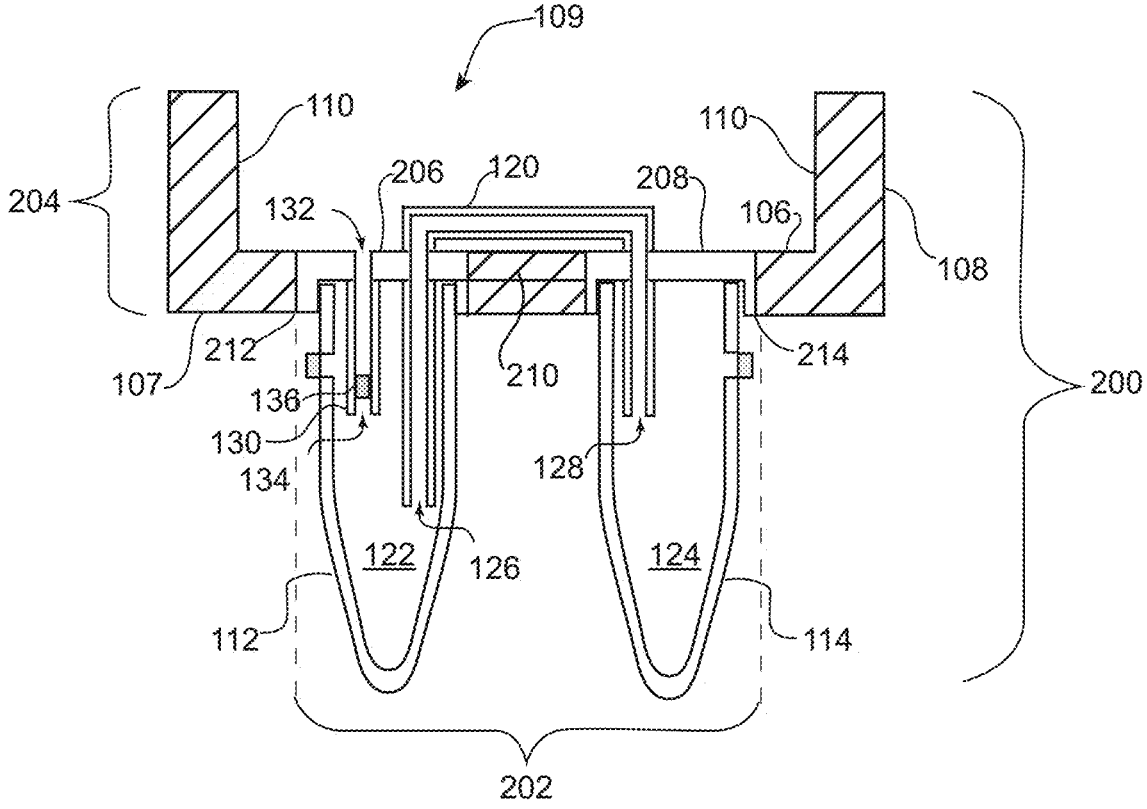
FIG. 2B illustrates an assembled cross-sectional view in the x-z plane of the sample preparation lid of FIG. 2A, in accordance with at least one embodiment.

FIG. 2B illustrates a cross-sectional view in the x-z plane of sample preparation lid 200 in the assembled state, comprising sample preparation vial subassembly 202 and lid body subassembly 204. In at least one embodiment, insertion plugs 206 and 208 are seated within sockets 212 and 214, respectively. In at least one embodiment, beam 210 may seat within a notch (not shown) within lid floor 106. In at least one embodiment, insertion plugs 206 and 208 may be scaled within sockets 212 and 214 by a suitable adhesive material to avoid leakage of liquid contents and maintain sterility. In at least one embodiment, sample preparation vials 112 and 114 extend over outer surface 107 of lid body 104. In at least one embodiment, sample preparation vials 112 and 114 are substantially orthogonal to outer surface 107. In at least one embodiment, sample preparation vials 112 and 114 may extend at an oblique angle relative to outer surface 107.

In at least one embodiment, conduit 120 may extend across lid floor 106. While conduit 120 is shown as a straight tube with rectilinear corners, in at least one embodiment conduit 120 may also be curved. In at least one embodiment, conduit 120 may be a free-hanging structure, as shown, or may have attachment points to beam 210 (also with insertion plugs 206 and 208). In at least one embodiment, conduit 120 may comprise one or more joints in common with beam 210, where the joints may be formed during the manufacturing process. In at least one embodiment, an adhesive may be applied to adhere conduit 120 to beam 210 during an assembly operation.

Figure 2C:
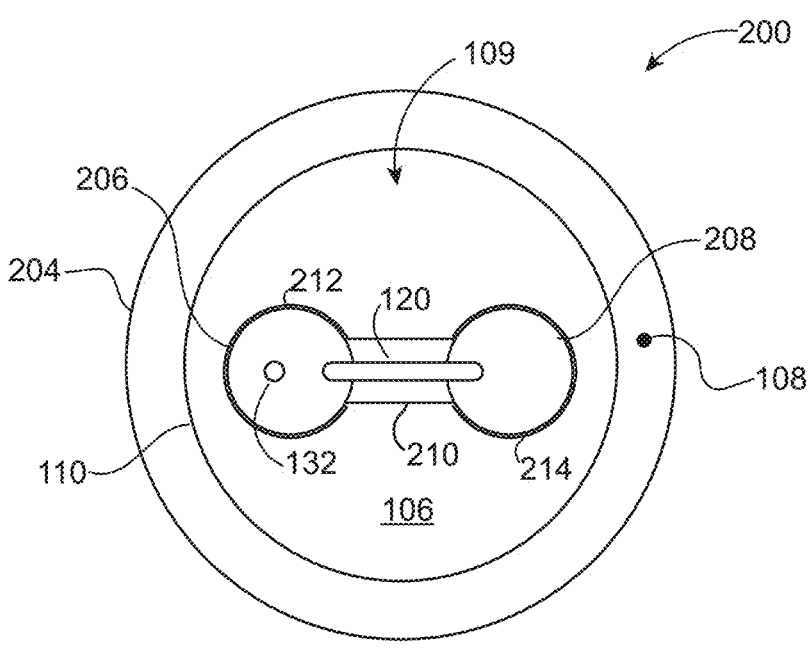
FIG. 2C illustrates a plan view in the x-y plane of a first side of the sample preparation lid of FIG. 2B, in accordance with at least one embodiment.

FIG. 2C illustrates a plan view in the x-y plane of sample preparation lid 200, showing a view into cavity 109 of lid body subassembly 204, in accordance with at least one embodiment. In at least one embodiment, cavity 109 is inside of lid sidewall 108, surrounded by inner surface 110. In at least one embodiment, lid body subassembly 204 has a substantially cylindrical geometry. In at least one embodiment, insertion plugs 206 and 208 are shown in plan view, seated within sockets 212 and 214 in lid floor 106. In at least one embodiment, beam 210 may be seated within notch within lid floor 106, or rest on lid floor 106. In at least one embodiment, conduit 120 extends between insertion plugs 206 and 208, passing through insertion plugs 206 and 208 as shown in FIGS. 2A and 2B.

Figure 2D:
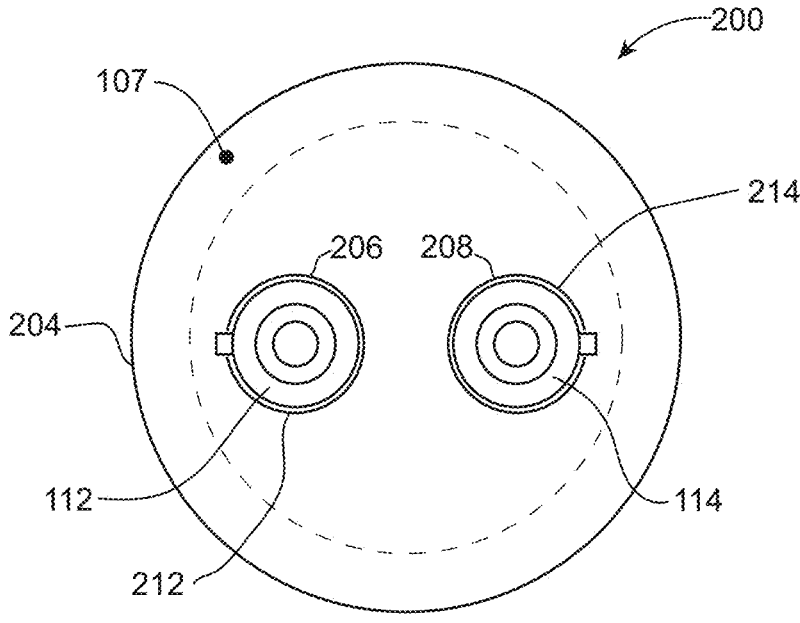
FIG. 2D illustrates a plan view in the x-y plane of a second side of the sample preparation lid of FIG. 2B, in accordance with at least one embodiment.

FIG. 2D illustrates a plan view in the x-y plane of sample preparation lid 200, showing a view of outer surface 107, in accordance with at least one embodiment. In at least one embodiment, sample preparation vials 112 and 114 extend over outer surface 107 from insertion plugs 206 and 208 that are seated within sockets 212 and 214 as shown in FIG. 2C.

Figure 3A:
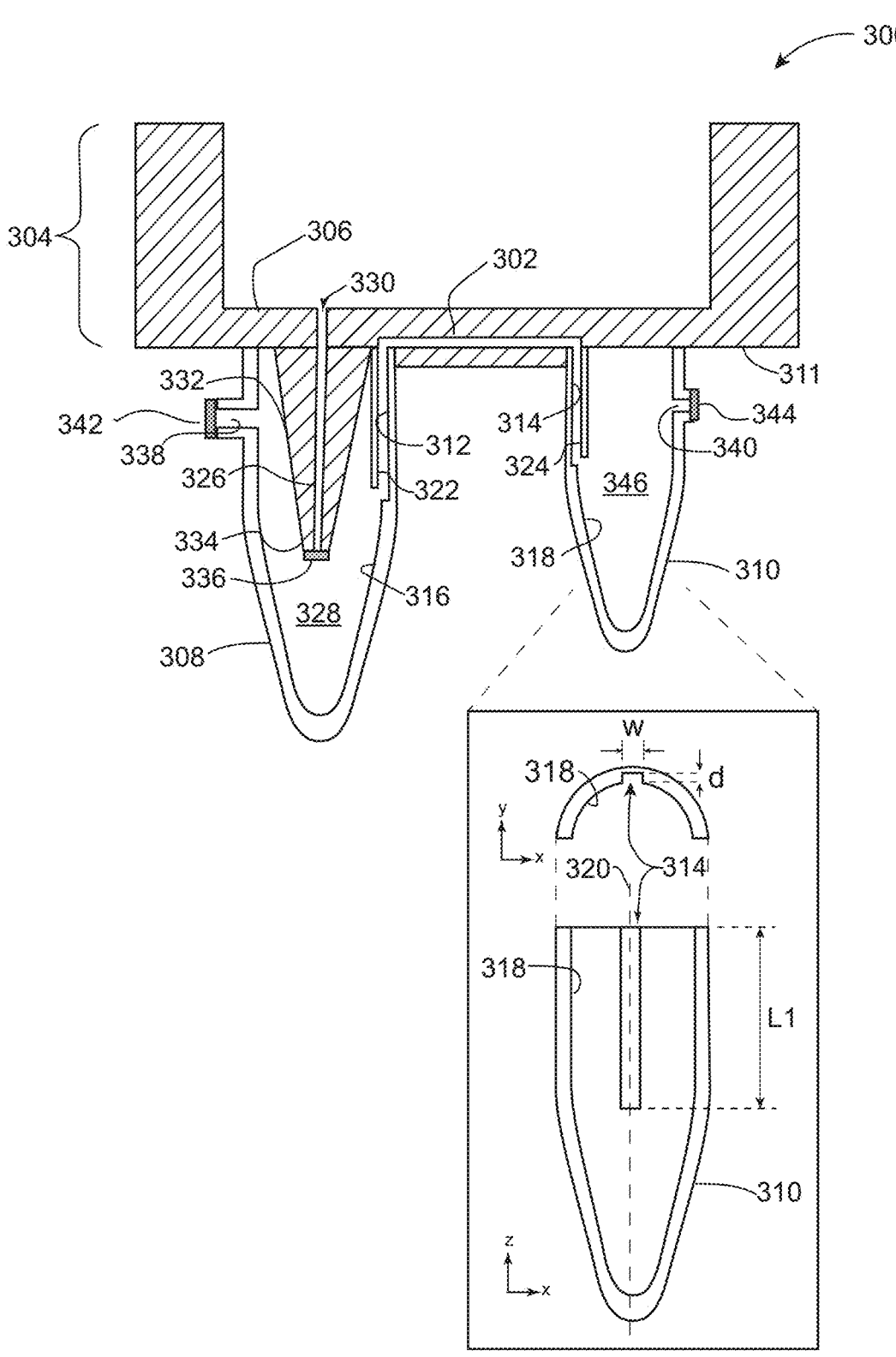
FIG. 3A illustrates a cross-sectional view in the x-z plane of a sample preparation lid comprising an embedded channel, in accordance with at least one embodiment.

FIG. 3A illustrates a cross-sectional view in the x-z plane of sample preparation lid 300, comprising channel 302 embedded within lid floor 306 of lid body 304, in accordance with at least one embodiment. In at least one embodiment, channel 302 may interconnect sample preparation vials 308 and 310, extending from outer surface 311 of lid body 304. In at least one embodiment, sample preparation vials 308 and 310 respectively comprise grooves 312 and 314 embedded within inner walls 316 and 318 of sample preparation vials 308 and 310. Both a partial plan and a profile view of groove 314 are shown in the inset of the figure. In at least one embodiment, grooves 312 and 314 may be rectangular channels, as shown in the inset.

In at least one embodiment, grooves 312 and 314 may extend a length, such as length $L_1$, along inner walls 316 and 318, respectively. In at least one embodiment, grooves 312 and 314 may extend substantially vertically (e.g., parallel to the central axis 320 of sample preparation vial 310 extending in the z-direction of the figure). In at least one embodiment, grooves 312 and 314 may have a width, such as width w, extending in the x-direction or the figure. In at least one embodiment, groove 314 may be recessed into inner wall 318 by depth d. In at least one embodiment, width w and depth d may be adjusted to obtain a desired hydraulic diameter $d_h$ (for example, for a rectangular channel, $d_h = 2[w \times d]/[w+d]$).

In at least one embodiment, grooves 312 and 314 are open channels, as shown. In at least one embodiment, grooves 312 and 314 may comprise membranes 322 and 324, respectively, closing interior volumes of grooves 312 and 314 to increase capillary action when transporting fluids. In at least one embodiment, grooves 312 and 314 have microchannel dimensions, for example, having a hydraulic diameter $d_h$ of less than 1 mm. In at least one embodiment, the microchannel dimensions may enable capillary action within grooves 312 and 314, which may aid fluid transfer from sample preparation vial 308 to sample preparation vial 310. In at least one embodiment, length $L_1$, width w and depth d may also be adjusted to confine the volume of grooves 312 and 314 within desired limits for metering transfer of fluids.

In at least one embodiment, grooves 312 and 314 may be aligned with the ends of channel 302 within lid floor 306. In at least one embodiment, grooves 312 and 314 may be vertical extensions of channel 302, forming a contiguous fluid transfer conduit analogous to conduit 120 (FIG. 1A), described above.

In at least one embodiment, duct 326 extends into inner volume 328 of sample preparation vial 308 from aperture 330 in lid floor 306. In at least one embodiment, duct 326 may serve a similar function as conduit 130, described above. In at least one embodiment, duct 326 comprises wall 332 that may extend substantially orthogonally into inner volume 328 from outer surface 311 of lid body 304. In at least one embodiment, wall 332 may be conical, tapering from outer surface 311 to tip 334. In at least one embodiment, the conicity of wall 332 may be adjusted to optimize rigidity of duct 326. In at least one embodiment, tip 334 is capped by plug 336 to prevent leakage of analyte into sample preparation vial 308. In at least one embodiment, plug 336 may be operable to dissolve upon contact with the liquid contents of sample preparation vial 308.

In at least one embodiment, sample preparation vials 308 and 310 comprise vents 338 and 340, respectively. In at least one embodiment, vents 338 and 340 may be apertures within inner walls 316 and 318 of sample preparation vials 308 and 310. In at least one embodiment, vents 338 and 340 may comprise gas-permeable membranes 342 and 344, respectively. In at least one embodiment, gas-permeable membranes 342 and 344 may allow passage of air from inner volumes 328 and 346 for pressure adjustment, while preventing passage of liquids.

Figure 3B:
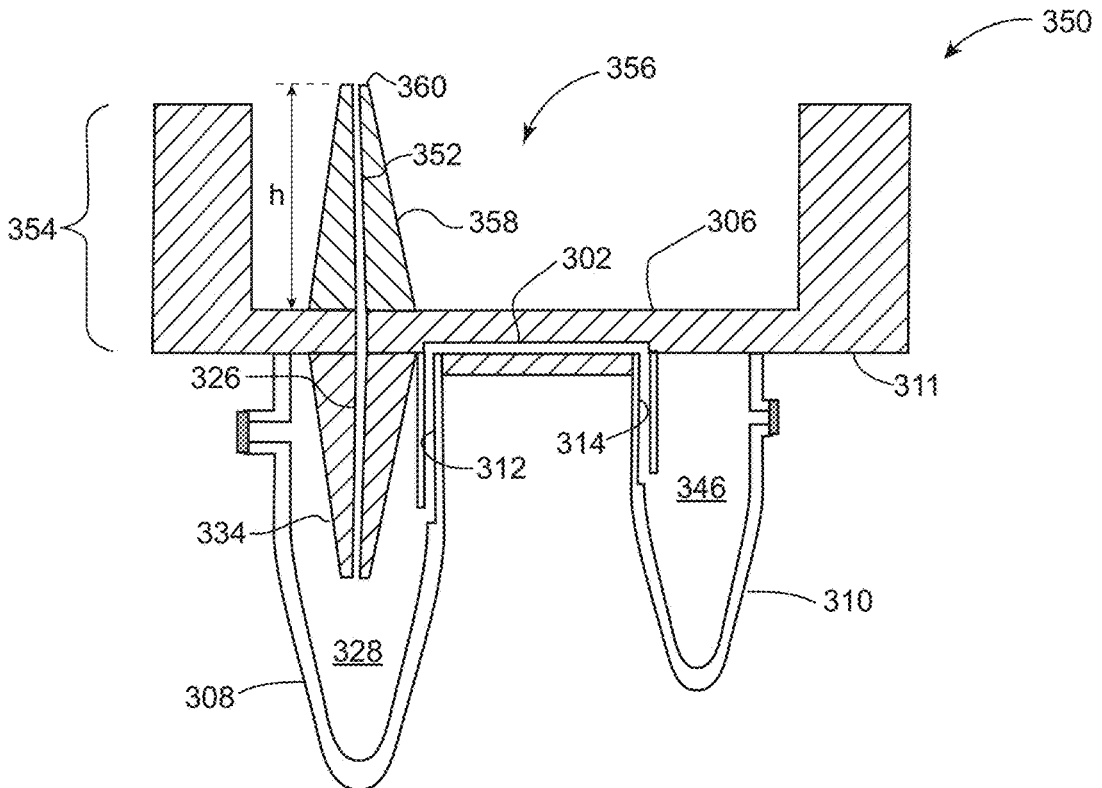
FIG. 3B illustrates a cross-sectional view in the x-z plane of a first side of the sample preparation lid of FIG. 3A, in accordance with at least one embodiment.

FIG. 3B illustrates a cross-sectional view in the x-z plane of sample preparation lid 350, comprising duct 352 extending into cavity 356 of lid body 354, in accordance with at least one embodiment. In at least one embodiment, duct 352 may be contiguous with duct 326, extending over lid floor 306. In at least one embodiment, wall 358 surrounding duct 352 may have a tapered thickness that decreases monotonically from lid floor 306 to tip 360. In at least one embodiment, the tapered thickness may provide some rigidity to duct 352 with a minimal increase in volume.

In at least one embodiment, duct 352 may extend a height h above lid floor 306. In at least one embodiment, the height h may be adjusted to increase the length of duct 326. In at least one embodiment, the length of duct 352 may add hydraulic resistance to control metering of fluid into sample preparation vial 308 from an attached fluid container, such as a culture tube. When inverted, in at least one embodiment the pressure head of fluid held within a culture tube may be sufficient to force fluid into sample preparation vial 308 without creating a suction. In at least one embodiment, adjustment of the additional length provided by duct 352 may enable tuning of the hydraulic resistance of the flow path from the culture tube into sample preparation vial 308.

In at least one embodiment, plug 336 may be adhered to tip 334. As noted above, in at least one embodiment plug 336 may comprise a sparingly soluble material that may dissolve and/or melt upon contact with warm aqueous reagent, as described above. In at least one embodiment, the reagent may be contained within sample preparation vial 308. In at least one embodiment, plug 336 may function as a temporary stopper or valve, preventing adventitious transfer of fluid into sample preparation vial 308. In at least one embodiment, adventitious transfer of fluid may occur from a culture tube or centrifuge tube attached to sample preparation lid 300. In at least one embodiment, plug 336 may be in contact with a liquid reagent contained within sample preparation vial 308. When the liquid reagent is warmed to a threshold temperature, in at least one embodiment plug 336 may melt and/or dissolve to open duct 326 and allow fluid to transfer from an attached fluid container into inner volume 328 of sample preparation vial 308.

Figure 3C:
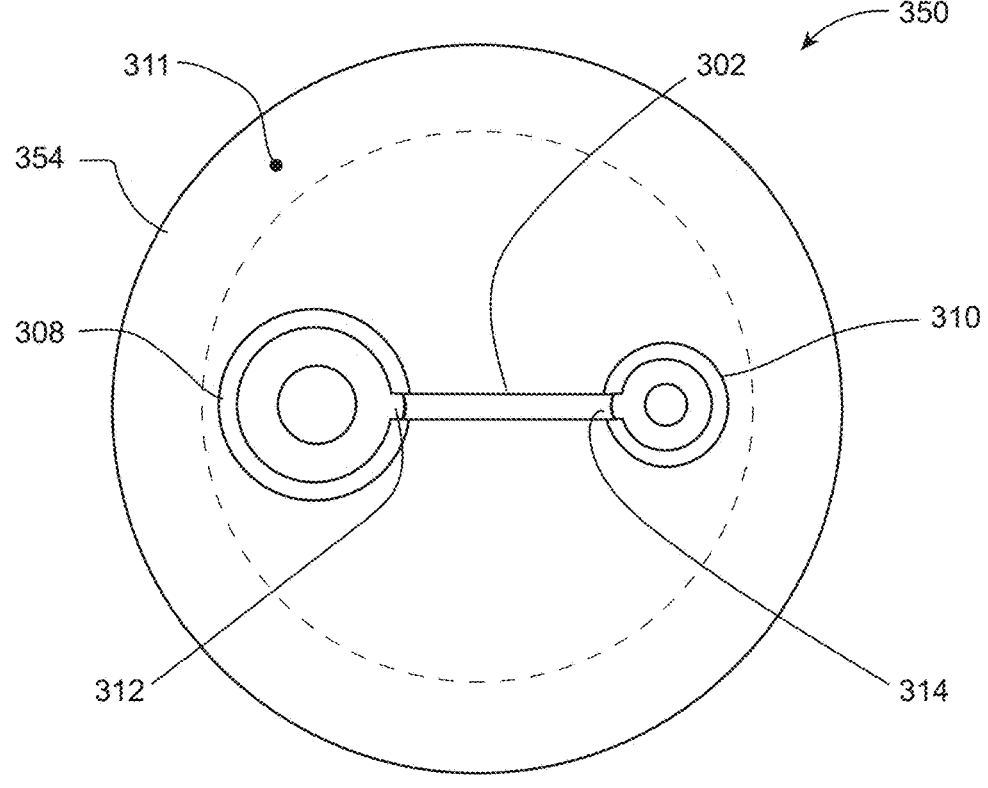
FIG. 3C illustrates a plan view in the x-y plane of a second side of the sample preparation lid of FIG. 3A, in accordance with at least one embodiment.

FIG. 3C illustrates a plan view in the x-y plane of sample preparation lid 350, showing the view of outer surface 311, in accordance with at least one embodiment. In at least one embodiment, channel 302 extends between grooves 312 and 314 in sample preparation vials 308 and 310, respectively. In at least one embodiment, channel 302 may be a groove within outer surface 311. In at least one embodiment, channel 302 may be embedded within lid body 354, below outer surface 311. In at least one embodiment, grooves 312 and 314 may be aligned to join channel 302, forming a continuous fluid transfer channel between sample preparation vials 308 and 310.

Figure 3D:
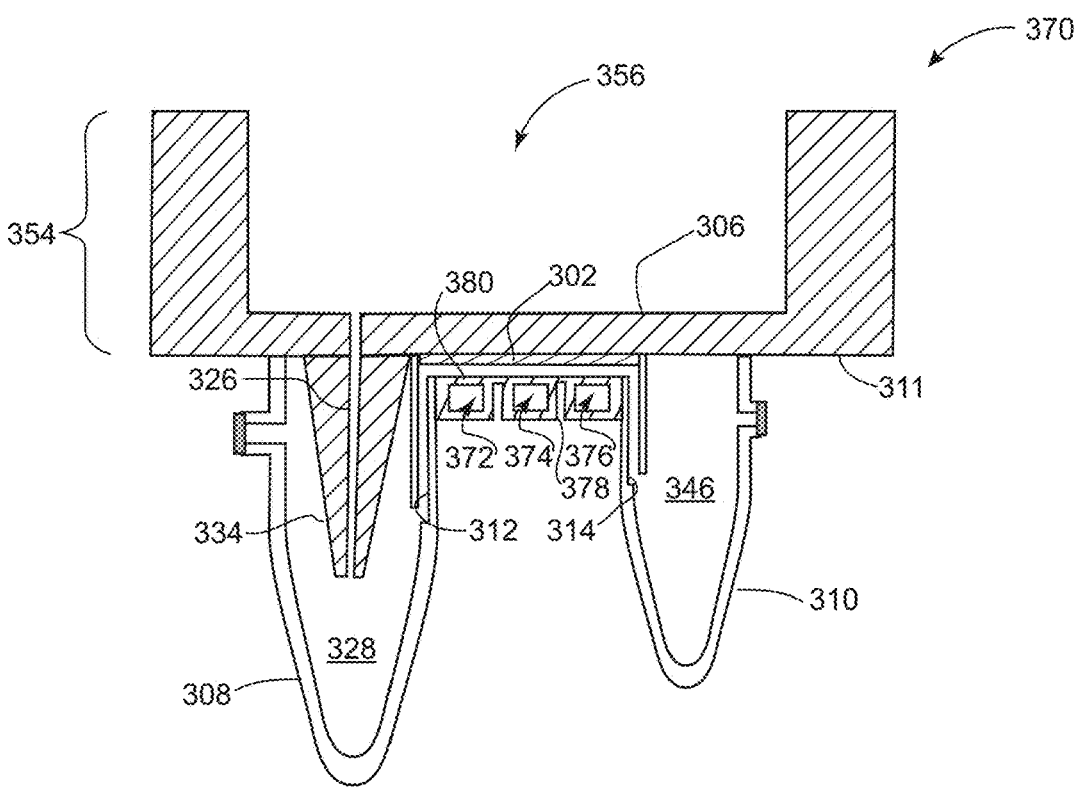
FIG. 3D illustrates a cross sectional view in the x-z plane of a sample preparation lid comprising peristaltic chambers within a peristaltic pumping structure, in accordance with at least one embodiment.

FIG. 3D illustrates a cross sectional view in the x-z plane of sample preparation lid 370, comprising peristaltic chambers 372, 374 and 376 within peristaltic pumping structure 378, in accordance with at least one embodiment. In at least one embodiment, peristaltic pumping structure 378 may be included within sample preparation lid 370 to provide movement of liquid from sample preparation vial 308 to sample preparation vial 310.

In at least one embodiment, peristaltic pumping structure 378 may be a molded or printed unitary structure, comprising peristaltic chambers 372, 374, and 376 and channel 302. While peristaltic chambers 372, 374, and 376 are shown to have a rectangular cross section, in at least one embodiment peristaltic chambers 372, 374, and 376 may have any suitable cross-sectional shape. In at least one embodiment, channel 302 extends through peristaltic pumping structure 378, immediately below or above peristaltic chambers 372, 374, and 376. In at least one embodiment, channel 302 may be separated from peristaltic chambers 372, 374, and 376 by membrane 380. In at least one embodiment, peristaltic pumping structure 378 comprises a viscoelastic material such as a polydimethylsiloxane (PDMS), enabling expansion and contraction of peristaltic chambers 372, 374, and 376. In at least one embodiment, movement of a pressurized fluid in and out of peristaltic chambers 372, 374, and 376 may actuate peristaltic pumping structure 378 to pump a liquid through channel 302.

In an exemplary implementation, a gas, such as air or nitrogen, or a liquid, such as water, may be pulse-pumped into each of peristaltic chambers 372, 374, and 376 in succession. In at least one embodiment, a pulse of fluid may fill an individual peristaltic chamber, for example, peristaltic chamber 372, causing peristaltic chamber 372 to inflate. In at least one embodiment, the inflation of peristaltic chamber 372 may cause a portion of membrane 380 immediately adjacent to peristaltic chamber 372 to bulge into channel 302. In at least one embodiment liquid within channel 302 may then be displaced down channel 302 by the pressure-actuated peristaltic action, in a direction toward sample preparation vial 310. According to at least one embodiment, the peristaltic pumping action may cause liquid within channel 302 to empty into inner volume 346 of sample preparation vial 310.

In at least one embodiment, peristaltic pumping of channel 302 may be continued by actuation of peristaltic chamber 374. Immediately following the pressurization of peristaltic chamber 372, in at least one embodiment peristaltic chamber 372 may remain inflated to block movement of liquid within channel 302 in the reverse direction (e.g., toward sample preparation vial 308). In at least one embodiment, peristaltic chamber 374 may be subsequently pressurized in a manner like the process described for peristaltic chamber 372. In at least one embodiment, the inflation of peristaltic chamber 374 may cause a portion of membrane 380 at the center of peristaltic pumping structure 378 to bulge into channel 302. In at least one embodiment, liquid within channel 302 may again be displaced by peristaltic action toward groove 314 of sample preparation vial 310. The peristaltic pumping action may cause liquid within channel 302 to empty into inner volume 346 of sample preparation vial 310, according to at least one embodiment.

Further peristaltic action may be continued by actuation of peristaltic chamber 376. In at least one embodiment, following pressurization and inflation of peristaltic chamber 374, peristaltic chamber 376 may be inflated by pumping fluid into peristaltic chamber 376 while peristaltic chamber 374 remains inflated. According to at least one embodiment, inflation of peristaltic chamber 376 may cause an adjacent portion of membrane 380 to bulge into the terminal region of channel 302, adjacent to sample preparation vial 310. In at least one embodiment, the peristaltic pumping action may drive liquid remaining within channel 302 into inner volume 346 of sample preparation vial 310.

In at least one embodiment, the entire peristaltic pumping cycle may be repeated to continue pumping of fluid from sample preparation vial 308 to sample preparation vial 310. In at least one embodiment, simultaneous deflation of peristaltic chambers 372, 374, and 376 may create a vacuum within channel 302, causing a suction that pulls liquid from inner volume 328 of sample preparation vial 308 into groove 312 and into channel 302. In at least one embodiment, once liquid has entered channel 302, the peristaltic pumping action may be repeated.

Figure 3E:
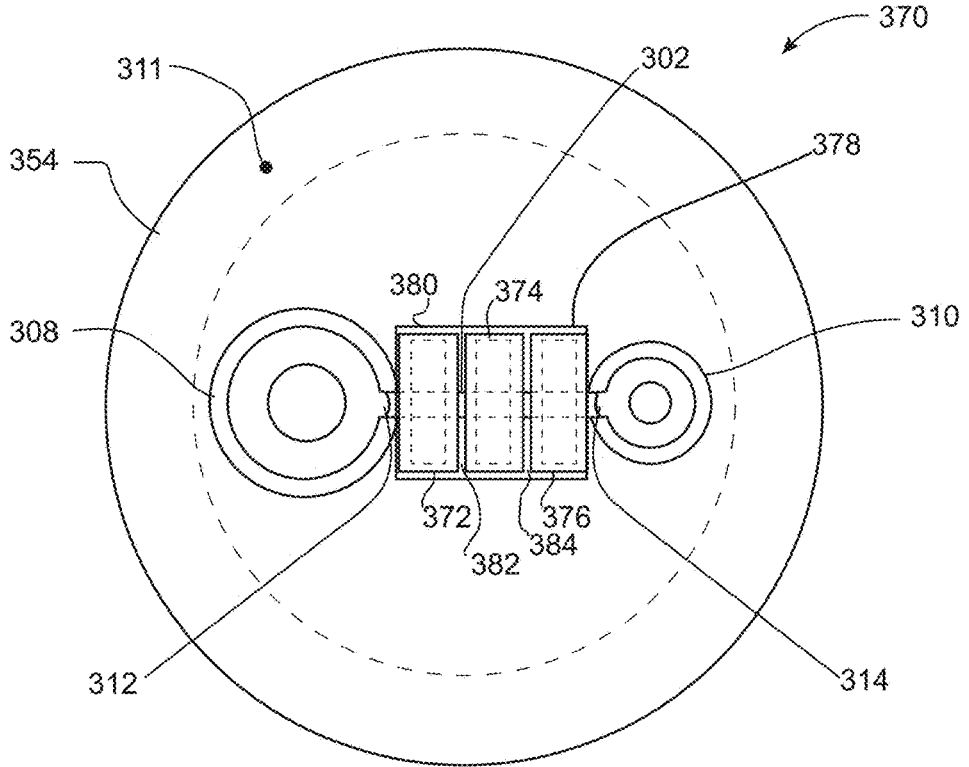
FIG. 3E illustrates a plan view in the x-y plane of the sample preparation lid shown in FIG. 3D, in accordance with at least one embodiment.

FIG. 3E illustrates a plan view in the x-y plane of sample preparation lid 370, comprising peristaltic pumping structure 378, in accordance with at least one embodiment. In at least one embodiment, peristaltic chambers 372, 374, and 376 are shown as elongated rectangular structures in FIG. 3E. In at least one embodiment, peristaltic chambers 372, 374, and 376 may have any suitable shape. The dashed boxes delineate the inner walls of peristaltic chambers 372, 374, and 376. In at least one embodiment, peristaltic chambers 372, 374, and 376 are dimensioned to cover the length of channel 302, spanning the distance between sample preparation vials 308 and 310. In at least one embodiment, gap 382 and 384 may be incorporated into peristaltic pumping structure 378. In at least one embodiment, gap 382 may be positioned between peristaltic chambers 372 and 374, whereas gap 384 may be positioned between peristaltic chambers 374 and 376. In at least one embodiment, gaps 382 and 384 may decouple expansion of individual peristaltic chambers from adjacent chambers.

Figure 3F:
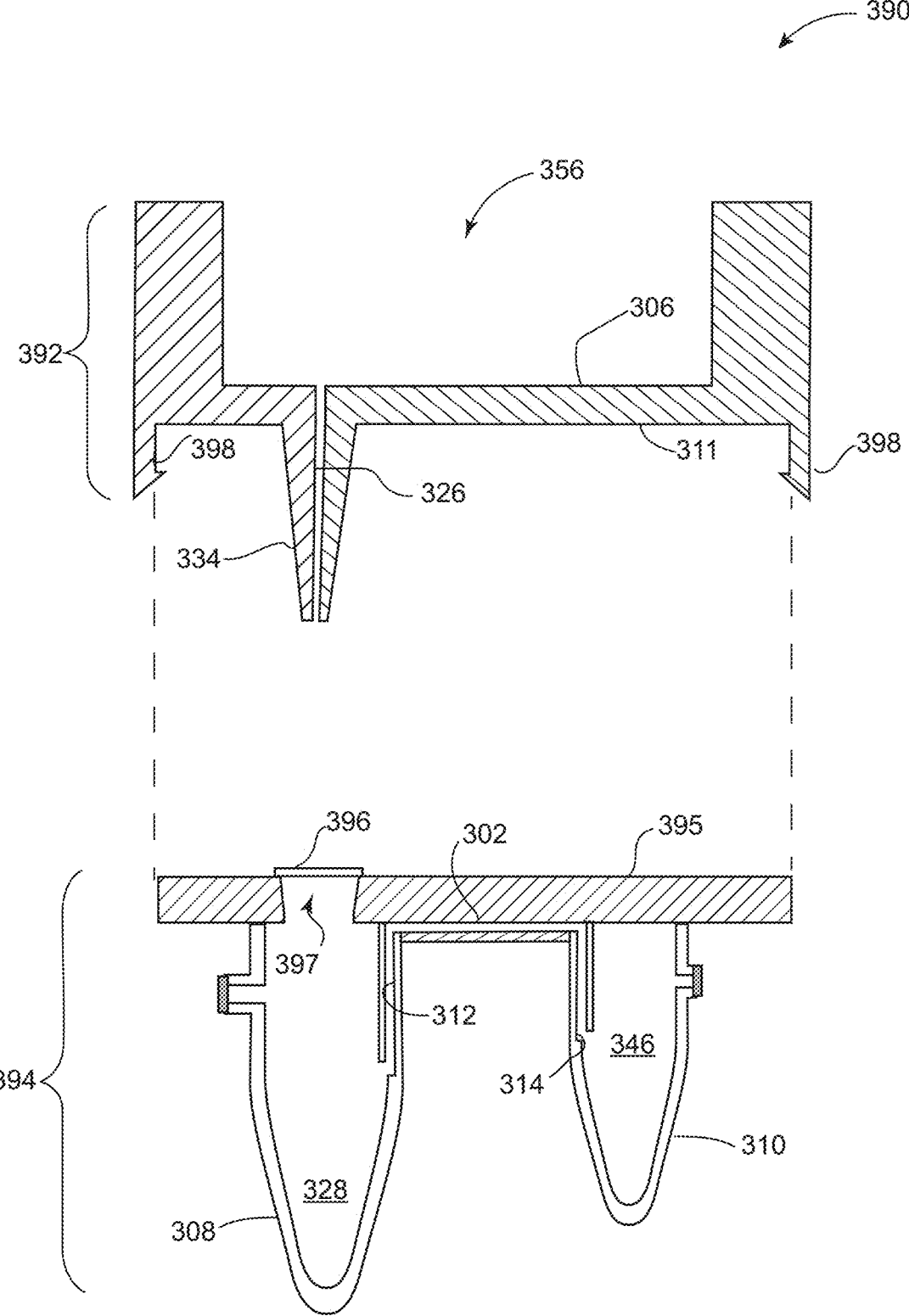
FIG. 3F illustrates an exploded cross-sectional view of a sample preparation lid assembly comprising separate lid and laboratory portions, in accordance with at least one embodiment.

FIG. 3F illustrates an exploded cross-sectional view of sample preparation lid assembly 390, comprising lid portion 392 and detachable laboratory portion 394, in accordance with at least one embodiment. In at least one embodiment, lid portion 392 is similar to lid body 354 described above. In at least one embodiment, lid portion 392 is separate from laboratory portion 394. In at least one embodiment, lid portion 392 may be employed to seal a culture tube (e.g., fluid container 102, FIG. 1A) as a stand-alone lid, without laboratory portion 394, enabling transport or storage of a culture tube without risk of inadvertent leakage of reagent into the culture tube, or contamination of reagent stored in sample vials. In at least one embodiment, laboratory portion 394 may be attached to lid portion 392 at a later time from the initial engagement with a culture tube.

In at least one embodiment, sample preparation lid assembly 390 may be assembled by attaching laboratory portion 394 to lid portion 392. In at least one embodiment, lid portion 392 may comprise seal 396 to protect contents within inner volume 328 from contamination. In at least one embodiment, lid portion 392 comprises tip 334, operable to pierce through seal 396 and thread through opening 397 in plate 395. In at least one embodiment, tip 334 may extend into inner volume 328 of sample preparation vial 308, as described above. In at least one embodiment, lid portion 392 comprises clips 398 that are operable to bend outward as plate 395 is positioned toward floor 306 of lid portion 392. In at least one embodiment, clips 398 are operable to snap back to initial shape once plate 395 is abutted against outer surface 311 of floor 306.

Figure 3G:
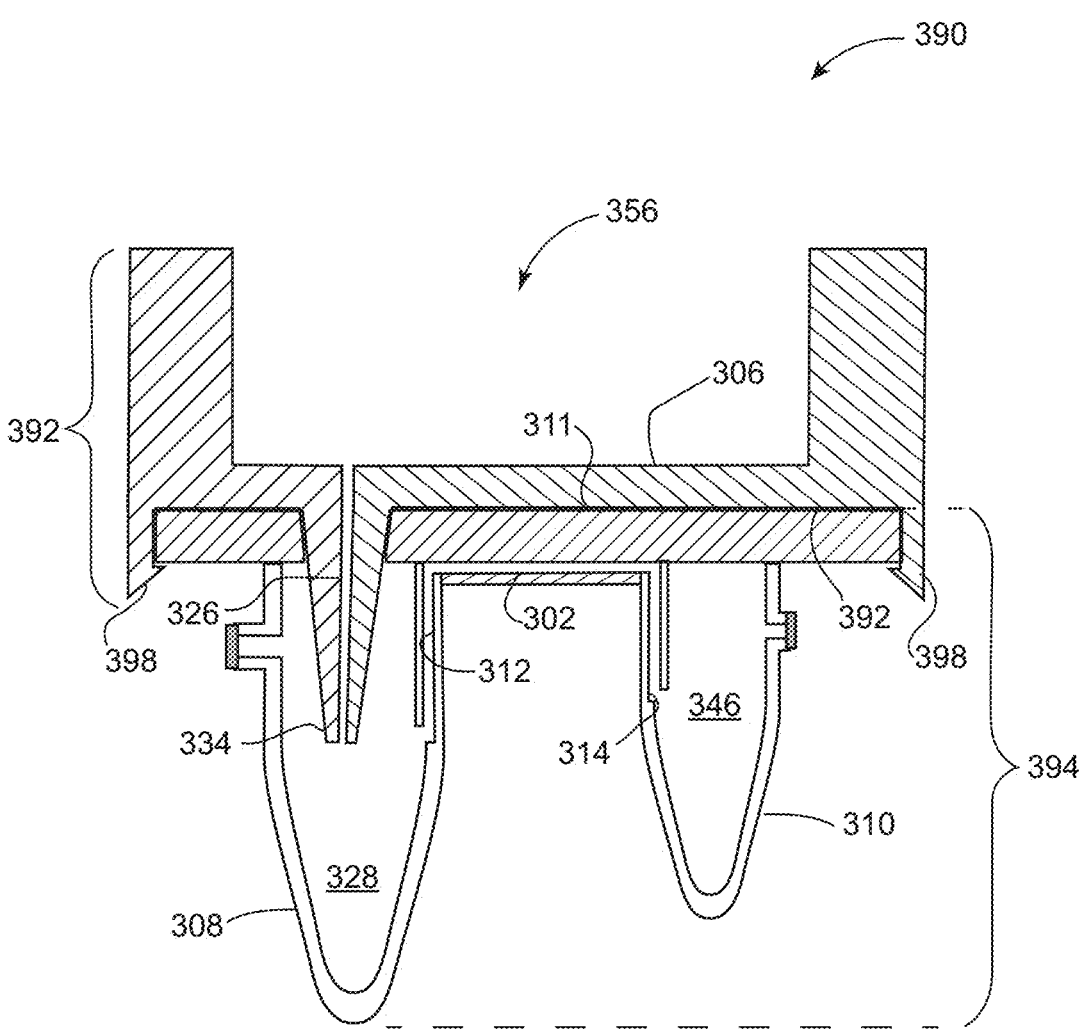
FIG. 3G illustrates an assembled cross-sectional view of the sample preparation lid assembly shown in FIG. 3F, in accordance with at least one embodiment.

FIG. 3G illustrates a cross-sectional view of sample preparation lid assembly 390 in the assembled state, in accordance with at least one embodiment. In at least one embodiment, plate 395 of laboratory portion 394 is press-fit between clips 398, which hold plate 395 against outer surface 311 lid portion 392. In at least one embodiment, tip 334 extends though opening 397 into inner volume 328 of sample preparation vial 308.

Figure 4:
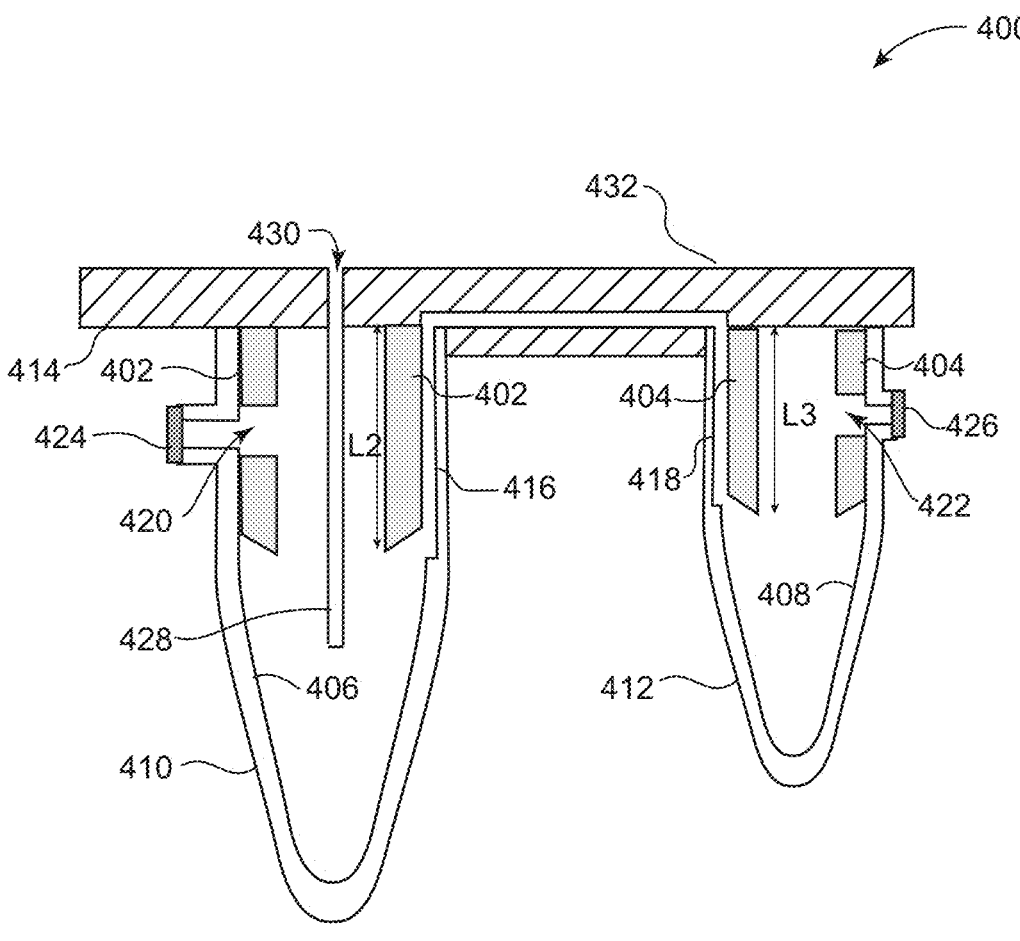
FIG. 4 illustrates a cross-sectional view in the x-z plane of a sample preparation lid comprising sleeve inserts, in accordance with at least one embodiment.

FIG. 4 illustrates a cross-sectional view in the x-z plane of sample preparation lid 400, in accordance with at least one embodiment. In at least one embodiment, sleeves 402 and 404 partially cover sidewalls 406 and 408 of sample preparation vials 410 and 412, respectively. In at least one embodiment, sleeves 402 and 404 may have a cylindrical geometry having lengths $L_2$ and $L_3$, respectively. In at least one embodiment, sleeves 402 and 404 may be integral with sample preparation vials 410 and 412, extending from surface 414. In at least one embodiment, sleeves 402 and 404 may be inserted into sample preparation vials 410 and 412 during an assembly process. In at least one embodiment, lengths $L_2$ and $L_3$ may be substantially the lengths of grooves 416 and 418, respectively. In at least one embodiment, sleeve 402 may cover most of groove 416, enabling groove 416 to function as a closed microchannel. In at least one embodiment, fluid contained within sample preparation vial 410 may be wicked into groove 416 by capillary action, aiding fluid transfer from sample preparation vial 410 to sample preparation vial 412.

Similarly, in at least one embodiment, sleeve 404 may enable groove 418 in sample preparation vial 412 to function as a microchannel, guiding fluid to enter sample preparation vial 412 at a specific depth. In at least one embodiment, sleeves 402 and 404 may be manufactured as separate assembly components. Sleeves 402 and 404 may be formed by an injection molding process, according to at least one embodiment. In at least one embodiment, sleeves 402 and 404 may be inserted into sample preparation vials 410 and 412, respectively, during assembly of sample preparation lid 400. In at least one embodiment, sleeves 402 and 404 may comprise a polymer material such as PP (polypropylene), HDPE (high-density polyethylene), PFA (perfluoroalkoxy polymer), or PTFE (polytetrafluoroethylene).

In at least one embodiment, sleeves 402 and 404 may comprise openings 420 and 422, respectively, to avoid obstruction of vents 424 and 426. In at least one embodiment, duct 428 extends into sample preparation vial 410 from aperture 430 in lid floor 432.

Figure 5:
FIG. 5 illustrates a cross-sectional view in the x-z plane of a sample preparation lid comprising reagent sacs within sample preparation vials, in accordance with at least one embodiment.
Figure 5:
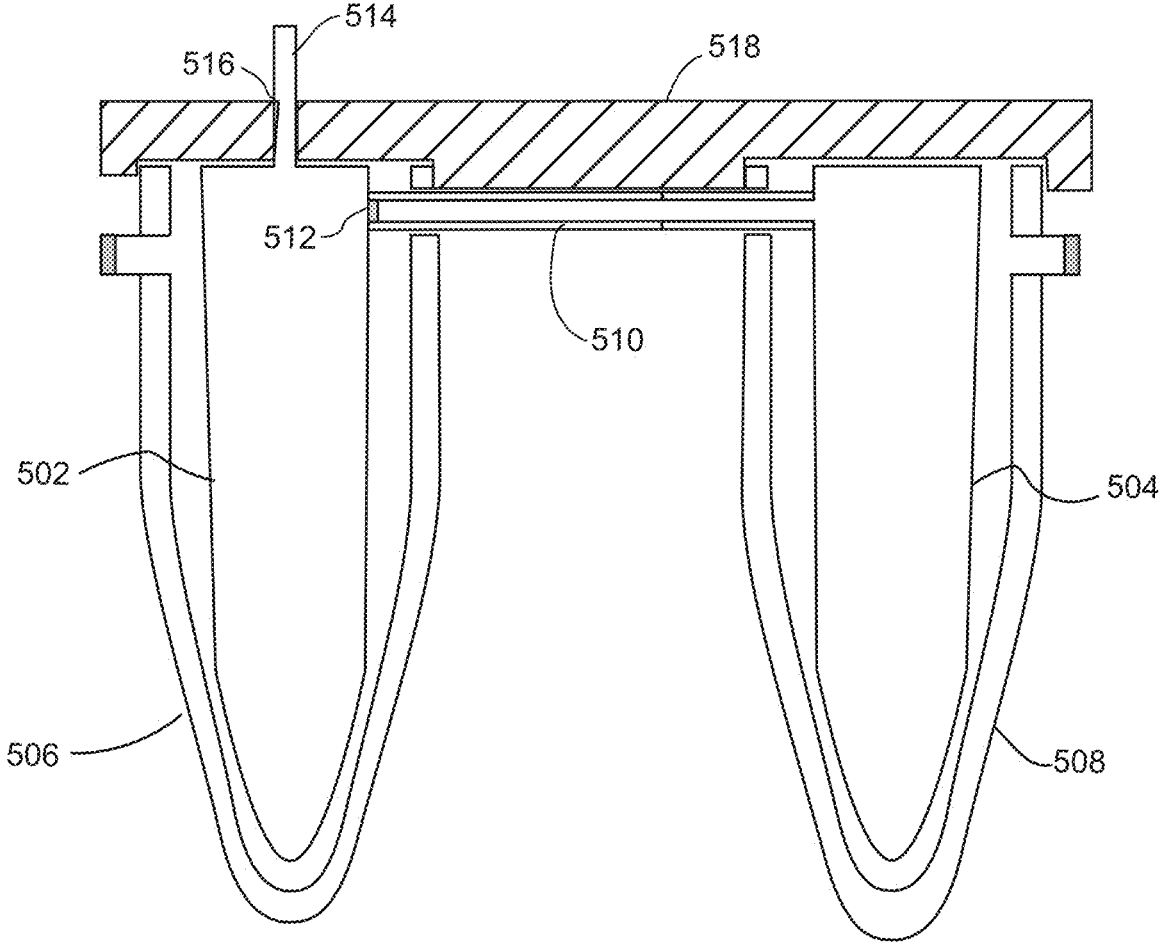

FIG. 5 illustrates a cross-sectional view in the x-z plane of sample preparation lid 500, comprising reagent sacs 502 and 504 within sample preparation vials 506 and 508, respectively, in accordance with at least one embodiment. In at least one embodiment, reagent sacs 502 and 504 may comprise a compliant polymer film, such as polyethylene film. In at least one embodiment, reagent sacs 502 and 504 may be manufactured separately from sample preparation vials 506 and 508 and subsequently assembled. In at least one embodiment, reagent sacs are prefilled with reagent. In at least one embodiment, reagent sacs 502 and 504 may have approximately the same volume of sample preparation vials 506 and 508.

In at least one embodiment, reagent sacs 502 and 504 may be disposable to enable reuse of sample preparation lid 500. In at least one embodiment, spent reagent sacs 502 and 504 may be removed and replaced by unused reagent sacs. In at least one embodiment, reagent sacs 502 and 504 may also facilitate manufacture of sample preparation lid 500. In at least one embodiment, reagent sacs 502 and 504 may be interconnected by tube 510. Tube 510 may enable fluid transfer from reagent sac 502 to reagent sac 504. In at least one embodiment, tube 510 may be a capillary tube. In at least one embodiment, plug 512 may be within tube 510. In at least one embodiment, plug 512 may be a temporary plug and may comprise a material that may melt and/or dissolve within warmed reagent.

In at least one embodiment, reagent sac 502 comprises inlet tube 514 that may extend from the top of reagent sac 502. In at least one embodiment, inlet tube 514 may extend through aperture 516 in lid floor 518. In at least one embodiment, inlet tube 514 may enable fluid transfer from an attached fluid container (e.g., fluid container 102, FIG. 1A) into reagent sac 502.

Figure 6:
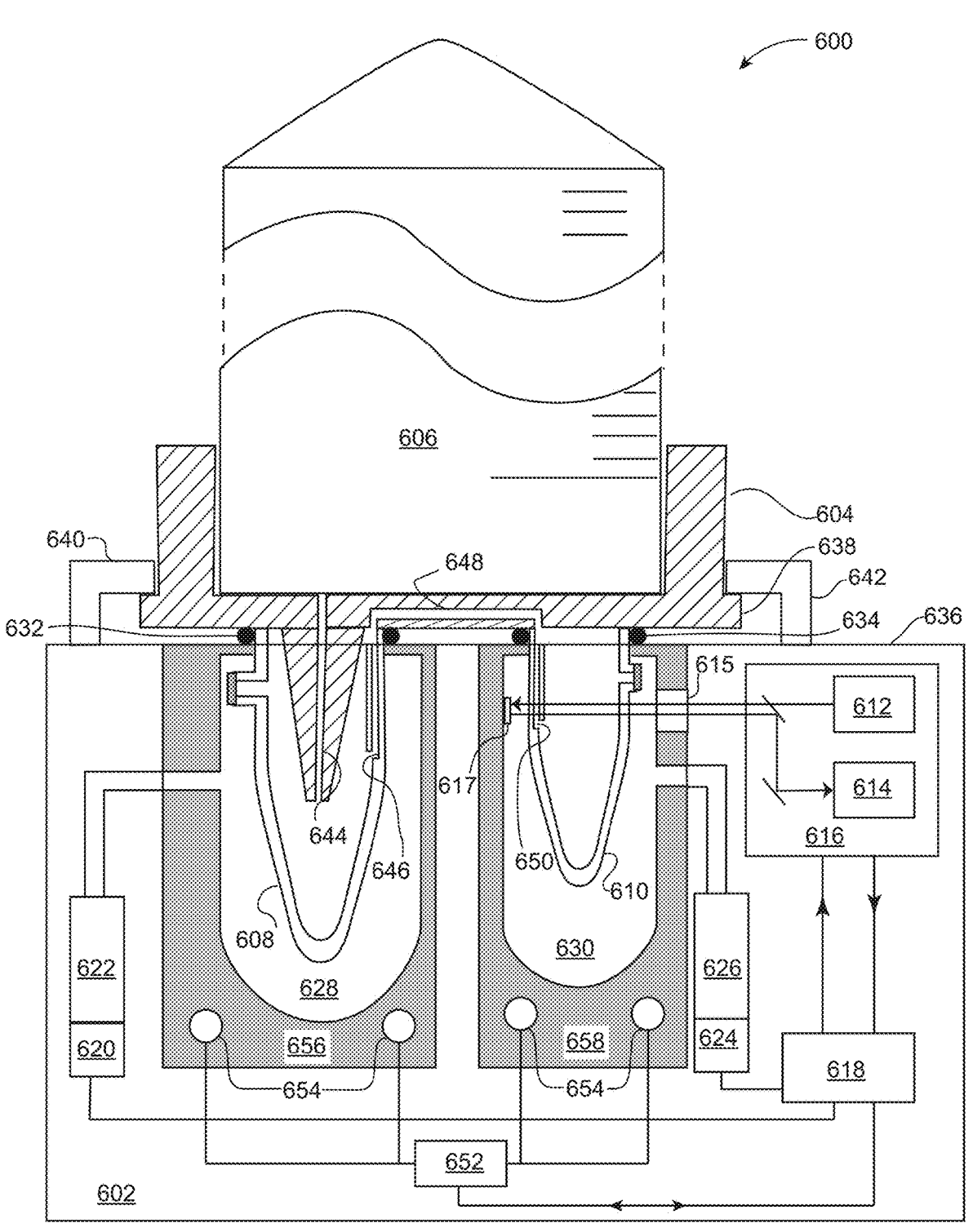
FIG. 6 illustrates a cross-sectional view in the x-z plane of a self-contained sample preparation and analysis laboratory comprising a sample preparation lid and an analysis station, in accordance with at least one embodiment.

FIG. 6 illustrates a cross-sectional view in the x-z plane of self-contained sample preparation and analysis laboratory 600, in accordance with at least one embodiment. In at least one embodiment, self-contained sample preparation and analysis laboratory 600 comprises automated analysis station 602 and sample preparation lid 604. In at least one embodiment, automated analysis station 602 may provide a portable or non-portable docking base unit for sample preparation lid 604. In at least one embodiment, sample preparation lid 604 may be substantially similar to sample preparation lids 100, 200, 300, 400, or 500, disclosed herein.

In at least one embodiment, automated analysis station 602 may enable automated fluid transfer from fluid container 606 to sample preparation vial 608, as well as from sample preparation vial 608 to sample preparation vial 610. In at least one embodiment, automated analysis station 602 may further comprise an incubation oven (not shown) to incubate media that may be contained within fluid container 606.

In at least one embodiment, automated analysis station 602 may further comprise miniaturized analytical instrumentation. In at least one embodiment automated analysis station 602 may comprise a spectrometric analysis unit comprising light source 612 and light detector 614. In at least one embodiment, light detector 614 is a spectrometer for resolution of light wavelengths. In at least one embodiment, light source 612 and light detector 614 are combined into integrated optical system 616. In at least one embodiment, light source 612 and light detector 614 may be separate stand-alone devices. In at least one embodiment, light source 612 may be a solid-state laser light source. In at least one embodiment, light source 612 may be a solid-state light emitting diode (LED) visible light or ultraviolet light laser. In at least one embodiment, light source 612 may be a stand-alone laser. In at least one embodiment, light detector 614 may be an integrated optical spectrometer. In at least one embodiment, light detector 614 may be a photodiode, for example, if wavelength resolution of the received light is not desired.

In the figure, an exemplary optical path for light source 612 and light detector 614 is illustrated. In at least one embodiment, light source 612 is shown to be emit a probe beam that passes straight through optical window 615 and sample preparation vial 610. In at least one embodiment, the probe beam may pass through a reagent solution contained within sample preparation vial 610. In at least one embodiment, a detectable colored or fluorescent analyte may be present within the reagent solution. In at least one embodiment, after passage through sample preparation vial 610, the probe beam reflects from surface 617, which may be a mirrored surface, and may pass through sample preparation vial 610 and optical window 615 a second time, reentering integrated optical system 616. In at least one embodiment, the optical path may comprise angled mirrors to deflect the probe beam to light detector 614. In at least one embodiment, light detector 614 may measure the absorbance of a colored analyte within the reagent solution. For fluorescent analytes, in at least one embodiment, an optical fiber between sample preparation vial 610 and light detector 614 may be included to collect fluorescent light emitted by the analyte. In at least one embodiment, a photodiode (not shown) may be included to detect fluorescent light in lieu of light detector 614.

In at least one embodiment, light source 612 and light detector 614 may be arranged to be located on opposing sides of sample preparation vial 610. In at least one embodiment, the probe beam may pass one way through optical window 615 and sample preparation vial 610, passing through a second optical window (not shown) to light detector 614.

In at least one embodiment, instrumentation control and data analysis may be combined within processor 618. In at least one embodiment, processor 618 is a Digital Signal Processor (DSP), an Application Specific Integrated Circuit (ASIC), a general-purpose Central Processing Unit (CPU), or a low power logic implementing a simple finite state machine to perform various processes described herein. In at least one embodiment, a tangible machine-readable storage medium (not shown) is electronically coupled to processor 618. Examples of a tangible machine-readable storage medium include, but are not limited to, recordable and non-recordable type media such as volatile and non-volatile memory devices, read only memory (ROM), random-access-memory (RAM), flash memory devices, floppy and other removable disks, magnetic storage media, optical storage media (e.g., Compact Disk Read-Only Memory (CD ROMS), Digital Versatile Disks (DVDs), etc.), among others. The machine-readable medium has machine-readable instructions, that when executed, cause processor 618 to perform the method as discussed with reference to various embodiments. In at least one embodiment, machine-readable storage medium may include instructions (also referred to as the program software code/instructions), such as instructions for the detection of a microorganism in a sample.

In at least one embodiment, processor 618 may be operable to execute software code for reading pressure sensors, temperature sensors, light detector 614, and for issuing digital commands to light source 612, light detector 614 and other devices described below. In at least one embodiment, processor 618 may be combined on a single printed circuit board (PCB) with light source 612 and light detector 614 (or integrated optical system 616). In at least one embodiment, processor 618 may further command pump driver circuit 620, coupled to pumping mechanism 622 and pump driver circuit 624, coupled to pumping mechanism 626. In at least one embodiment, pump driver circuits 620 and 624 are combined on a single PCB with processor 618, light source 612, and light detector 614.

In at least one embodiment, analysis station 602 may comprise chamber 628 and chamber 630, in which sample preparation vials 608 and 610 may be respectively seated. In at least one embodiment, chambers 628 and 630 may be controlled pressure and temperature chambers, for automating fluid transfer and chemical reactions. In at least one embodiment, on commands issued by processor 618, pumping mechanisms 622 and 626 may independently control the pressure within chamber 628 and chamber 630. In at least one embodiment, pumps 622 and 626 may pump in two directions. In at least one embodiment, pumping mechanisms 622 and 626 may be reversable miniature piston-driven air pumps. In at least one embodiment, processor 618 may be electrically coupled to pressure sensors (not shown).

In at least one embodiment, for pressure control, chambers 628 and 630 may be hermetically sealed by o-rings 632 and 634 fitted onto sample preparation vials 608 and 610, respectively. In at least one embodiment, o-rings 632 and 634 may be pressed against surface 636 of analysis station 602 by clamping sample preparation lid 604. In at least one embodiment, sample preparation lid 604 may comprise lip 638 or similar structure, which clamps 640 and 642 may engage to press sample preparation lid 604 against surface 636, compressing O-rings 632 and 634 to form a seal.

An exemplary procedure for operating automated analysis station 602 is described in the following paragraphs. Sample preparation vial 608 may be hermetically sealed within chamber 628, according to at least one embodiment. In at least one embodiment, chamber 628 may be initially filled with air at pressure. In at least one embodiment, pumping mechanism 622 may be commanded to partially evacuate chamber 628, lowering the pressure within. In at least one embodiment, the lowered pressure within chamber 628 may cause sample preparation vial 608 to expand, creating a partial vacuum within sample preparation vial 608. In at least one embodiment, the lowered pressure within sample preparation vial 608 may cause drive fluid transfer from fluid container 606. In at least one embodiment, the suction created within sample preparation vial 608 may enable flow of several nanoliters to several microliters of liquid sample from fluid container 606 through duct tube 644.

In at least one embodiment, sample of liquid taken from fluid container 606 may react with a reagent solution within sample preparation vial 608 for a prescribed duration. In at least one embodiment, after reaction, a sample of reagent may be transferred to sample preparation vial 610. In at least one embodiment, the fluid transfer may be effectuated by reversing pumping mechanism 622 to increase the pressure within chamber 628, compressing sample preparation vial 608. Simultaneously, in at least one embodiment, pumping mechanism 626 may be commanded by processor 618 to pump out the air in chamber 630, lowering the pressure within chamber 630. Sample preparation vial 610 may expand, creating a partial vacuum within sample preparation vial 610, according to at least one embodiment. In at least one embodiment, the push-pull action of increased pressure in chamber 628 and decreased pressure in chamber 630 may enable a sample of fluid to flow from sample preparation vial 608 to sample preparation vial 610. In at least one embodiment, the flow path may include groove 646, channel 648 and groove 650. In at least one embodiment, compression of sample preparation vial 608 may cause fluid to move into groove 646. In at least one embodiment, fluid may be pre-drawn into groove 646 by capillary action, as described above. In at least one embodiment, suction created within sample preparation vial 610 may pull a sample of fluid (e.g., several nanoliters to several microliters) through channel 648 and into groove 650 of sample preparation vial 610.

In at least one embodiment, analysis station 602 comprises temperature controller 652 for controlling the temperature of chambers 628 and 630, which may drive heater cartridges 654 embedded within block 656 and block 658. In at least one embodiment, blocks 656 and 658 comprise chambers 628 and 630, respectively. In at least one embodiment, temperature controller 652 may be electrically coupled to temperature sensors (not shown), such as thermocouples or resistance temperature devices (RTDs) embedded within blocks 656 and 658.

In at least one embodiment, temperature controller 652 is electronically coupled to processor 618. In at least one embodiment, temperature controller 652 may be incorporated on a single PCB with processor 618. In at least one embodiment, processor 618 may read temperatures of blocks 656 and 658 through temperature controller 652 and issue digital commands to temperature controller 652. In at least one embodiment, processor 618 may command temperature controller 652 to ramp up the temperature of block 656 to a setpoint temperature for a programmed duration, followed by a gradual decrease of the temperature to a preset base level. In at least one embodiment, the temperature profile of block 656 may be optimized for control of specific chemical reactions, such as enzymatic lysing of bacterial cells. In at least one embodiment, examples of temperature control may include resistive heating, positive temperature coefficient (PTC) heating. Additional heating methods may include, in at least one embodiment, heating by circulating a temperature-controlled fluid that is heated in a heat exchanger within the base unit and routed to corresponding chambers containing the vials.

Figure 7:
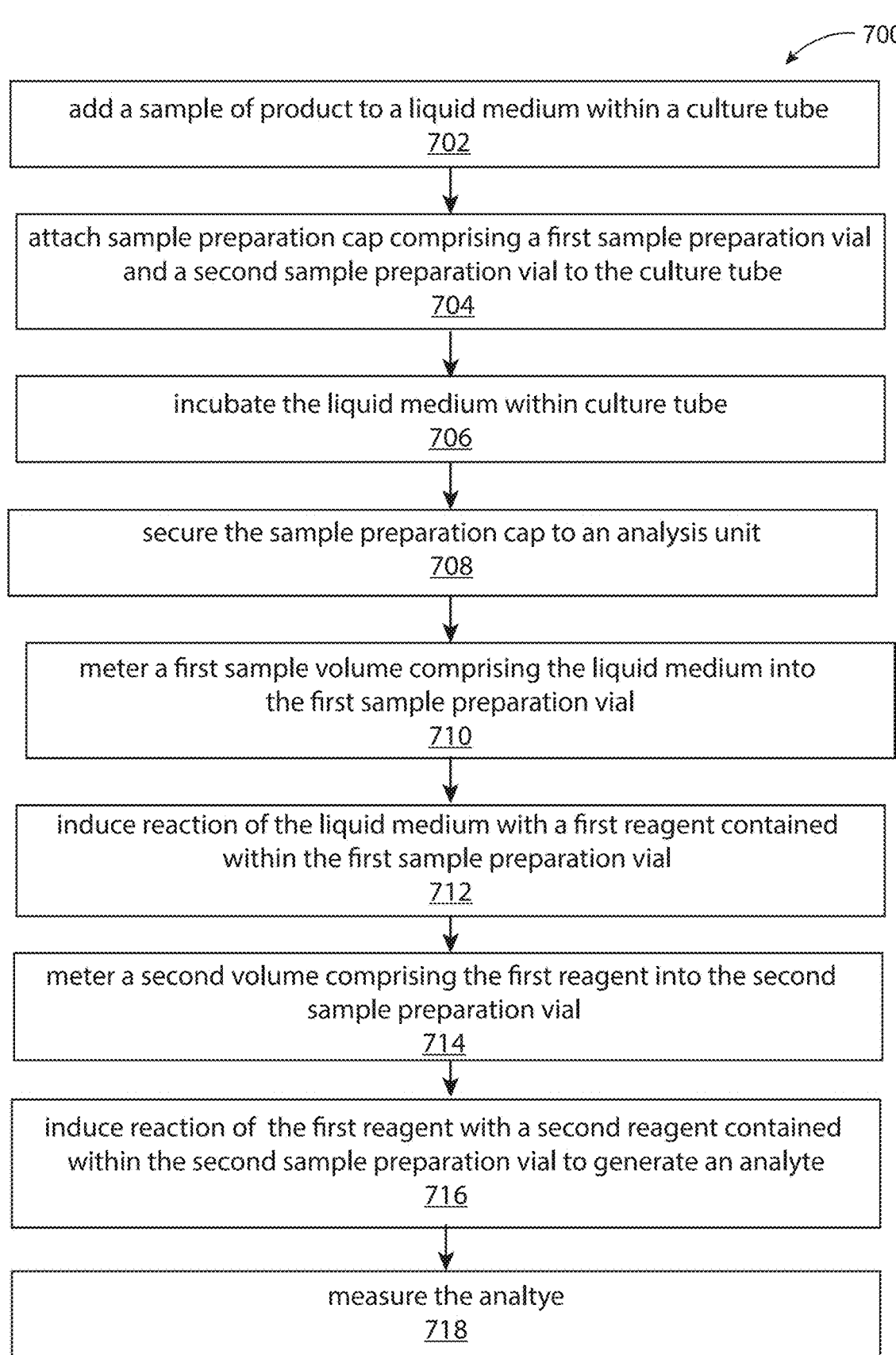
FIG. 7 illustrates a flow chart summarizing an exemplary method for operating a self-contained sample preparation and analysis laboratory, in accordance with at least one embodiment.

FIG. 7 illustrates flow chart 700, summarizing an exemplary method for operating a self-contained sample preparation and analysis laboratory, in accordance with at least one embodiment. In at least one embodiment, the various blocks shown here can be implemented in hardware, software, or a combination of them. In at least one embodiment, the self-contained sample preparation and analysis laboratory may comprise a sample preparation lid according to some embodiments of the disclosure, secured to a fluid container, such as a culture tube, centrifuge tube, test tube, bottle, jar, etc. In at least one embodiment, the self-contained sample preparation and analysis laboratory may further comprise an automated analysis station, such as automated analysis station 602, described above and shown in FIG. 6. In at least one embodiment, the sample preparation lid may be configured to dock onto the automated analysis station. In at least one embodiment, the automated analysis station may be operable to enable automated sample preparation and analysis of a biological or chemical material of which a sample may be placed within a liquid medium contained within the fluid container.

In block 702, a fluid container-sample preparation lid system is provided for sampling of biological or chemical specimens. As an example, in at least one embodiment, a disposable culture tube-sample preparation lid system is obtained by a technician who is charged with monitoring bacterial contamination within a food processing plant. In at least one embodiment, the culture tube (e.g., fluid container 606, FIG. 6) has been previously sterilized and filled with a liquid bacterial growth medium within the culture tube, which may have been sealed with a sterile seal. Similarly, in at least one embodiment, reagents may have been added to the sample preparation vials (e.g., sample preparation vials 608 and 610, FIG. 6) prior to assembly of the sample preparation lid (e.g., sample preparation lid 604, FIG. 6). In at least one embodiment, a swipe or a portion of a food sample may be inoculated into the liquid growth medium contained within the culture tube. The operation may be performed in a sterilized environment.

In block 704, the sample preparation lid may be attached to the inoculated culture tube. In at least one embodiment, the sample preparation lid may have a threaded sidewall (e.g., lid sidewall 108, FIG. 1A), enabling twisting the lid onto the culture tube. In at least one embodiment, the sample preparation lid may be press-fitted onto the culture tube. Under some conditions, the attachment of the sample preparation lid onto the culture tube may be performed in a sterile environment.

In block 706, the growth medium may be incubated for a prescribed duration, enabling multiplication of microorganisms (e.g., bacteria, protozoa or viruses) within the growth medium. The extent of growth of microorganisms may be limited by the incubation temperature and length of incubation duration. In at least one embodiment, the incubation temperature may be limited to 30° C. Incubation duration may range between 1 to 72 hours.

In at least one embodiment, the incubation may be performed in an incubator oven, where the culture tube may be held upright (e.g., sample preparation lid is on top, whereas the liquid growth medium at the bottom of the culture tube) within a rack in the oven. In at least one embodiment, an incubation oven may be integrated onto the automated analysis station. In at least one embodiment, the sample preparation lid may be engaged with the automated analysis station prior to the start of incubation, where the culture tube is within the integrated incubation oven.

In block 708, the sample lid may be engaged with the analysis station after the incubation period, if the analysis station is not equipped with an incubation oven, according to at least one embodiment. If the automated analysis station comprises an incubation oven, in at least one embodiment the sample preparation lid may be engaged with the automated analysis station prior to the start of incubation. In at least one embodiment, engagement of the automated analysis station may comprise inversion of the culture tube-sample-preparation lid system and inserting the sample preparation vials into receiving chambers (e.g., chambers 628 and 630, FIG. 6) built into the automated analysis station.

In at least one embodiment, o-rings (e.g., o-rings 632 and 634) or similar seals may be pre-assembled onto the sample preparation vials or assembled prior to engagement of the sample preparation lid with the automated analysis station. In at least one embodiment, a clamping mechanism (e.g., clamps 640 and 642, FIG. 6) may be applied to secure the sample preparation lid to the automated analysis station. In at least one embodiment, the clamping mechanism may also compress the o-rings or similar type of seal between the lid body and the automated analysis station, forming a hermetic seal around the sample preparation vials at the entrances to the receiving chambers. In at least one embodiment, the hermetic seals may enable airtightness of the receiving chambers.

In block 710, a small volume of the growth medium (e.g., nanoliters to several microliters) may be transferred into the first sample preparation vial (e.g., sample preparation vial 608, FIG. 6) after incubation is complete. In at least one embodiment, the analysis station may comprise an embedded microprocessor, such as processor 618 shown in FIG. 6. In at least one embodiment, the analysis station may also comprise air pumps (e.g., pumps 622 and 626, FIG. 6). In at least one embodiment, the microprocessor may be electrically coupled to pump driver circuits, such that the microprocessor may command the air pumps according to software instructions executed by the microprocessor. In at least one embodiment, the air pumps may be coupled to receiving chambers, and operable to pump air into the receiving chambers, as well as evacuating air from the receiving chambers. In this manner, in at least one embodiment, the pressure within the receiving chambers may be increased or decreased, respectively. Sample preparation vial walls may comprise a flexible polymer, enabling compression and expansion of the vial walls under increased or reduced pressure, respectively, within the receiving chambers.

In at least one embodiment, the first sample preparation vial may be subject to reduced pressure within its receiving chamber by evacuating the air within through operation of the associated air pump, creating a partial vacuum. In at least one embodiment, the walls of the first sample preparation vial may expand, causing a suction to pull a small volume of liquid growth medium into the first sample vial. In at least one embodiment growth medium may contain a large concentration of a bacterium.

In block 712, the first sample preparation vial may contain a first reagent. In at least one embodiment, the growth medium sample may contain a large concentration of bacterial cells and may be diluted within the reagent contained within the first sample preparation vial. In at least one embodiment, reagent may comprise a bacterial cell lysis enzyme broth. In at least one embodiment, a complete lysis of the sampled bacterial cells may be initiated by raising the temperature of the lysis reagent broth. In at least one embodiment, the analysis station may comprise a temperature controller (e.g., temperature controller 652, FIG. 6) that is electrically coupled to heating elements (e.g., heater cartridges 654, FIG. 6). In at least one embodiment, resistive heating is one example of heating the reagent.

In at least one embodiment, alternative heating methods, such as the examples that have been noted herein, may also be employed. In at least one embodiment, the microprocessor may be electrically coupled to the temperature controller. In at least one embodiment, the microprocessor may issue digital commands to ramp the temperature of the receiving chamber holding the first sample preparation vial. By this process, in at least one embodiment, the temperature of the lysis reagent may be raised from room temperature (e.g., 20° C.) to a first setpoint temperature (e.g., 37° C.). In at least one embodiment, the lysis reagent within the first sample preparation vial may be held at this setpoint temperature for a prescribed first duration. After lysis is complete, in at least one embodiment, the microprocessor may command the temperature controller to ramp the temperature down to a preset base temperature. In at least one embodiment, the contents of the bacterial cells, including bacterial DNA, may be liberated and suspended within the lysis reagent.

In block 714, a sample of the lysis reagent containing bacterial DNA may be transferred to the second sample preparation vial (e.g., sample preparation vial 610, FIG. 6) after lysis is complete, according to at least one embodiment. In at least one embodiment, the microprocessor may command a second air pump to evacuate a second receiving chamber holding the second sample preparation vial. In at least one embodiment, the second receiving chamber may be partially evacuated, causing the wall of the second sample preparation vial to expand. In at least one embodiment, the first air pump may pump air back into the first receiving chamber, pressurizing that chamber to help force some first reagent into a first groove (e.g., groove 646, FIG. 6) in the first sample preparation vial.

In at least one embodiment, the first groove may be partially covered, forming a capillary or microchannel along the wall of the first sample preparation vial, as described above. In at least one embodiment, pressurization of the first sample preparation vial and depressurization of the second sample preparation vial may act to force a sample volume of lysis reagent into the second sample preparation vial. In at least one embodiment, a microchannel (e.g., channel 648, FIG. 6), embedded within the lid floor, may interconnect the first sample preparation vial to the second sample preparation vial. In at least one embodiment, the first groove, and a second groove within the second preparation vial, may be coupled to the interconnecting microchannel. In at least one embodiment, the second groove may be partially covered to form a microchannel. In at least one embodiment, the combination of first groove, interconnecting microchannel and second groove may form a continuous microchannel, enabling transfer of lysis reagent from the first sample preparation vial to the second sample preparation vial.

In at least one embodiment, the push-pull action of pressurization and evacuation of the first and second receiving chambers, respectively, may enable fluid transfer from the first sample preparation vial to the second sample preparation vial.

In block 716, a sample volume (e.g., several nanoliters to several microliters) of the lysis reagent has been transferred into the second sample preparation vial. In at least one embodiment, second sample preparation vial may contain a second reagent, such as a polymerase chain reaction (PCR) medium. In at least one embodiment, the lysis sample may be diluted within the PCR medium. In at least one embodiment, a PCR reaction may be carried out at an elevated temperature. To raise the temperature of the PCR medium, in at least one embodiment, the microprocessor may command the temperature controller to ramp the temperature of the second receiving chamber to a second setpoint temperature, which may be a prescribed reaction temperature.

In at least one embodiment, the PCR medium may be held at the second setpoint temperature (e.g., the prescribed reaction temperature) for a second prescribed duration. In at least one embodiment, during this time, the DNA fragments may be reproduced many thousands of times, greatly increasing their concentration. After the prescribed duration, in at least one embodiment, the microprocessor may command the temperature controller to reduce the temperature of the second sample preparation vial to the base temperature.

In block 718, the contents of the second sample preparation vial may be qualitatively and/or quantitatively analyzed. In at least one embodiment, a colored analyte may be formed during the PCR reaction by binding a chromophore to specific DNA strands. In at least one embodiment, specific strands may identify a particular microorganism. In at least one embodiment, the analysis station may comprise a light source (e.g., light source 612, FIG. 6) and a spectrometer (e.g., light detector 614, FIG. 6). In at least one embodiment, the light source may be a solid-state visible laser. In at least one embodiment, the light source may emit a probe beam of visible or ultraviolet light that may be absorbed by the chromophore. In at least one embodiment, the probe beam may be directed to the spectrometer through the second sample preparation vial. An exemplary optical path is shown in FIG. 6. In at least one embodiment, the spectrometer may measure the absorption of the probe beam to detect and quantify the chromophore. In at least one embodiment, the light absorbance by the chromophore may constitute an optical signal that is transduced to an electronic signal by the spectrometer. In at least one embodiment, the microprocessor may be electrically coupled to the spectrometer. In at least one embodiment, electronic signals from the spectrometer may be read and digitized by the microprocessor. In at least one embodiment, software routines executed by the microprocessor may be operable to quantify and record the light absorbance.

In at least one embodiment, the chromophore may fluoresce (e.g., a fluorophore) when excited by blue to ultraviolet light. Here, the light source may emit blue to ultraviolet light, exciting fluorescence in the chromophore. In at least one embodiment, the light emitted by the fluorophore may be directed by suitable optics to the spectrometer. The spectrometer may measure the intensity of light emitted by the fluorophore. The microprocessor may execute software routines to quantify and record the fluorescence, according to at least one embodiment.

The following examples are provided that illustrate the various embodiments. The examples can be combined with other examples. As such, various embodiments can be combined with other embodiments without changing the scope of the invention.

Example 1 is a sample preparation lid, comprising a lid body; a first sample preparation vial that extends over the lid body; and a second sample preparation vial that extends over the lid body, wherein a first conduit extends between the first sample preparation vial and the second sample preparation vial, wherein the first conduit opens into the first sample preparation vial and into the second sample preparation vial, wherein a second conduit extends through the lid body, and wherein the second conduit opens into the first sample preparation vial.

Example 2 includes all the features of example 1, wherein the first conduit is an interconnective channel that extends within the lid body between the first sample preparation vial and the second sample preparation vial.

Example 3 includes all the features of example 2, wherein the first sample preparation vial comprises a first groove that extends along a first interior surface of the first sample preparation vial, and wherein the first groove is contiguous with a first end of the interconnective channel.

Example 4 includes all the features of example 3, wherein the second sample preparation vial comprises a second groove that extends along a second interior surface of the second sample preparation vial, and wherein the second groove is contiguous with a second end of the interconnective channel.

Example 5 includes all the features of example 1, wherein the first conduit is a tube that extends over the lid body between the first sample preparation vial and the second sample preparation vial.

Example 6 includes all the features of example 1, wherein an aperture, and wherein the aperture opens into the first sample preparation vial.

Example 7 includes all the features of example 1, wherein the second conduit comprises a duct that extends a depth into the first sample preparation vial from an aperture that extends through the lid body.

Example 8 includes all the features of example 1, wherein the first sample preparation vial comprises a first vent and the second sample preparation vial comprises a second vent.

Example 9 includes all the features of example 8, wherein the first vent comprises a first gas-permeable membrane and the second vent comprises a second gas-permeable membrane.

Example 10 includes all the features of example 1, wherein the first sample preparation vial comprises a first reagent sac, and wherein the second sample preparation vial comprises a second reagent sac.

Example 11 includes all the features of example 10, wherein a first tube extends between the first reagent sac and the second reagent sac, and wherein a second tube extends from the first reagent sac through an aperture within the lid body.

Example 12 includes all the features of example 1, wherein the lid body comprises a lid portion and a laboratory portion, wherein the laboratory portion is detachable from the lid portion, wherein the laboratory portion comprises at least one sample preparation vial.

Example 13 includes all the features of example 12, wherein the laboratory portion comprises a plate and an opening in the plate, wherein a seal is over the opening.

Example 14 includes all the features of example 12, wherein the lid portion comprises one or more clips, wherein the one or more clips are operable to secure the laboratory portion against the lid portion.

Example 15 is a system, comprising an automated analysis station, comprising; a first receiving chamber; a second receiving chamber; a first pumping mechanism coupled to the first receiving chamber; and a second pumping mechanism is coupled to the second receiving chamber; and a sample preparation lid comprising: a lid body; a first sample preparation vial that extends over the lid body; and a second sample preparation vial that extends over the lid body, wherein a first conduit extends between the first sample preparation vial and the second sample preparation vial, wherein a first end of the first conduit opens into the first sample preparation vial and a second end of the first conduit opens into the second sample preparation vial, wherein a second conduit extends through the lid body, and wherein the second conduit opens into the first sample preparation vial.

Example 16 includes all the features of example 15, wherein the automated analysis station further comprises a processor electrically coupled to the first pumping mechanism and the second pumping mechanism.

Example 17 includes all the features of example 16, wherein the automated analysis station further comprises a light source, a light detector, at least one optical window within a wall of the second receiving chamber, and wherein the processor is electrically coupled to the light source and to the light detector; and a temperature controller, wherein the temperature controller is electrically coupled to one or more heating elements that are adjacent to the first receiving chamber and the second receiving chamber, and wherein the processor is electrically coupled to the temperature controller.

Example 18 is a method, comprising providing a sample preparation lid comprising a first sample preparation vial and a second sample preparation vial, wherein the first sample preparation vial and the second sample preparation vial extend over a lid body; adding a sample into a liquid medium contained within a fluid container; attaching the sample preparation lid to the fluid container; incubating the liquid medium; and inserting the first sample preparation vial and the second sample preparation vial into a first chamber and into a second chamber, respectively, of an automated analysis station.

Example 19 includes all the features of example 18, further comprising drawing a first volume of the liquid medium into the first sample preparation vial, wherein the first sample preparation vial contains a first reagent.

Example 20 includes all the features of example 19, wherein drawing the first volume of the liquid medium into the first sample preparation vial comprises reducing a first pressure of the first chamber.

Example 21 includes all the features of example 19, further comprising ramping a first temperature of the first chamber to a first setpoint temperature, wherein the first reagent reacts with the first volume of the liquid medium for a first duration; transferring a second volume of the first reagent into the second sample preparation vial, and wherein the second sample preparation vial contains a second reagent; and ramping a second temperature of the second chamber to a second setpoint temperature, wherein the second reagent reacts with the second volume of the first reagent for a second duration.

Example 22 includes all the features of example 21, wherein transferring the second volume of the first reagent into the second sample preparation vial comprises increasing a first pressure of the first chamber and decreasing a second pressure of the second chamber.

Example 23 includes all the features of example 21, further comprising analyzing the second reagent, wherein an optical signal from the second reagent is measured.

Besides what is described herein, various modifications may be made to the disclosed embodiments and implementations thereof without departing from their scope. Therefore, illustrations of embodiments herein should be construed as examples only, and not restrictive to the scope of the present disclosure. The scope of the invention should be measured solely by reference to the claims that follow.

I claim:

1. A sample preparation lid, comprising:

a lid body;

a first sample preparation vial that extends over the lid body; and a second sample preparation vial that extends over the lid body, wherein a first conduit extends between the first sample preparation vial and the second sample preparation vial, wherein the first conduit opens into the first sample preparation vial and into the second sample preparation vial, wherein a second conduit extends through the lid body, wherein the second conduit opens into the first sample preparation vial, and wherein the second conduit comprises a duct that extends a depth into the first sample preparation vial from an aperture that extends through the lid body.

2. The sample preparation lid of claim 1, wherein the first conduit is an interconnective channel that extends within the lid body between the first sample preparation vial and the second sample preparation vial.

3. The sample preparation lid of claim 2, wherein the first sample preparation vial comprises a first groove that extends along a first interior surface of the first sample preparation vial, and wherein the first groove is contiguous with a first end of the interconnective channel.

4. The sample preparation lid of claim 3, wherein the second sample preparation vial comprises a second groove that extends along a second interior surface of the second sample preparation vial, and wherein the second groove is contiguous with a second end of the interconnective channel.

5. The sample preparation lid of claim 1, wherein the first conduit is a tube that extends over the lid body between the first sample preparation vial and the second sample preparation vial.

6. The sample preparation lid of claim 1, wherein an aperture opens into the first sample preparation vial.

7. The sample preparation lid of claim 1, wherein the first sample preparation vial comprises a first vent and the second sample preparation vial comprises a second vent.

8. The sample preparation lid of claim 7, wherein the first vent comprises a first gas-permeable membrane and the second vent comprises a second gas-permeable membrane.

9. The sample preparation lid of claim 1, wherein the first sample preparation vial comprises a first reagent sac, and wherein the second sample preparation vial comprises a second reagent sac.

10. The sample preparation lid of claim 9, wherein a first tube extends between the first reagent sac and the second reagent sac, and wherein a second tube extends from the first reagent sac through an aperture within the lid body.

11. The sample preparation lid of claim 1, wherein the lid body comprises a lid portion and a laboratory portion, wherein the laboratory portion is detachable from the lid portion, and wherein the laboratory portion comprises at least one sample preparation vial.

12. The sample preparation lid of claim 11, wherein the laboratory portion comprises a plate and an opening in the plate, and wherein a seal is over the opening.

13. The sample preparation lid of claim 11, wherein the lid portion comprises one or more clips, and wherein the one or more clips are operable to secure the laboratory portion against the lid portion.

14. A system, comprising:
an automated analysis station, comprising;
a first receiving chamber;
a second receiving chamber;
a first pumping mechanism coupled to the first receiving chamber; and
a second pumping mechanism coupled to the second receiving chamber; and
a sample preparation lid comprising:
a lid body;
a first sample preparation vial that extends over the lid body; and
a second sample preparation vial that extends over the lid body, wherein a first conduit extends between the first sample preparation vial and the second sample preparation vial, wherein a first end of the first conduit opens into the first sample preparation vial and a second end of the first conduit opens into the second sample preparation vial, wherein a second conduit extends through the lid body, wherein the second conduit opens into the first sample preparation vial, and wherein the second conduit comprises a duct that extends a depth into the first sample preparation vial from an aperture that extends through the lid body.

15. The system of claim 14, wherein the automated analysis station further comprises a processor electrically coupled to the first pumping mechanism and the second pumping mechanism.

16. The system of claim 15, wherein the automated analysis station further comprises:
a light source, a light detector, at least one optical window within a wall of the second receiving chamber, wherein the processor is electrically coupled to the light source and to the light detector; and
a temperature controller, wherein the temperature controller is electrically coupled to one or more heating elements that are adjacent to the first receiving chamber and the second receiving chamber, and wherein the processor is electrically coupled to the temperature controller.

17. A method, comprising:
providing a sample preparation lid comprising a first sample preparation vial and a second sample preparation vial, wherein the first sample preparation vial and the second sample preparation vial extend over a lid body;
adding a sample into a liquid medium contained within a fluid container;
attaching the sample preparation lid to the fluid container;
incubating the liquid medium; and
inserting the first sample preparation vial and the second sample preparation vial into a first chamber and into a second chamber, respectively, of an automated analysis station.

18. The method of claim 17, further comprising drawing a first volume of the liquid medium into the first sample preparation vial, wherein the first sample preparation vial contains a first reagent.

19. The method of claim 18, wherein drawing the first volume of the liquid medium into the first sample preparation vial comprises reducing a first pressure of the first chamber.

20. The method of claim 18, further comprising:
ramping a first temperature of the first chamber to a first setpoint temperature, wherein the first reagent reacts with the first volume of the liquid medium for a first duration;
transferring a second volume of the first reagent into the second sample preparation vial, wherein the second sample preparation vial contains a second reagent; and
ramping a second temperature of the second chamber to a second setpoint temperature, wherein the second reagent reacts with the second volume of the first reagent for a second duration.

21. The method of claim 20, wherein transferring the second volume of the first reagent into the second sample preparation vial comprises increasing a first pressure of the first chamber and decreasing a second pressure of the second chamber.

22. The method of claim 20, further comprising analyzing the second reagent, wherein an optical signal from the second reagent is measured.

* * * * *